US012619860B2

(12) United States Patent
Sakemi et al.

(10) Patent No.: US 12,619,860 B2
(45) Date of Patent: May 5, 2026

(54) METHOD AND DEVICE FOR CONTROLLING FIRING TIMING IN SPIKING NEURAL NETWORKS

(71) Applicant: NEC Corporation, Tokyo (JP)

(72) Inventors: Yusuke Sakemi, Tokyo (JP); Takeo Hosomi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 921 days.

(21) Appl. No.: 17/872,118

(22) Filed: Jul. 25, 2022

(65) Prior Publication Data

US 2023/0045589 A1     Feb. 9, 2023

(30) Foreign Application Priority Data

Aug. 6, 2021    (JP) ................................. 2021-130003

(51) Int. Cl.
*G06N 3/049*          (2023.01)
(52) U.S. Cl.
CPC .................................... *G06N 3/049* (2013.01)
(58) Field of Classification Search
None
See application file for complete search history.

(56) References Cited

U.S. PATENT DOCUMENTS

2018/0174026 A1* 6/2018 Davies .................. G06N 3/063
2018/0268015 A1* 9/2018 Sugaberry ......... G06F 16/24575

FOREIGN PATENT DOCUMENTS

JP        2018-136919 A     8/2018
WO       2020/013069 A1    1/2020

OTHER PUBLICATIONS

JP Office Action for JP Application No. 2021-130003, mailed on May 7, 2025 with English Translation.

* cited by examiner

*Primary Examiner* — Ryan C Vaughn
(74) *Attorney, Agent, or Firm* — Sughrue Mion, PLLC

(57)          ABSTRACT

A computation apparatus that includes a spiking neuron model. A spiking neuron model varies an index value of a signal output based on an input condition of a signal during an input time interval and outputs, based on the index value, a signal during an output time interval that starts after the input time interval ends.

7 Claims, 13 Drawing Sheets

METHOD AND DEVICE FOR CONTROLLING FIRING TIMING IN SPIKING NEURAL NETWORKS

This application is based upon and claims the benefit of priority from Japanese patent application No. 2021-130003, filed on Aug. 6, 2021, the disclosure of which is incorporated herein in its entirety by reference.

TECHNICAL FIELD

The present disclosure relates to a computation apparatus, a neural network system, a neuron model apparatus, a computation method and a program.

BACKGROUND ART

One type of neural network is a spiking neural network (SNN). For example, Japanese Unexamined Patent Application, First Publication No. 2018-136919 A (hereinafter Patent Document 1) describes a neuromorphic computing system in which a spiking neural network is implemented on a neuromorphic computing device.

In the spiking neural network, neuron models have internal states known as membrane potentials, and they output signals known as spikes based on the time evolution of the membrane potentials.

SUMMARY

A spiking neural network should preferably be able to efficiently perform data processing.

An example objective of the present disclosure is to provide a computation apparatus, a neural network system, a neuron model apparatus, a computation method and a program that can solve the above-mentioned problems.

According to a first example aspect of the present disclosure, a computation apparatus includes: a spiking neuron model that: varies an index value of a signal output based on an input condition of a signal during an input time interval; and outputs, based on the index value, a signal during an output time interval that starts after the input time interval ends.

According to a second example aspect of the present disclosure, a spiking neural network system includes a spiking neural network body and learning means. The neural network body includes neuron models including index value calculation means for varying an index value of a signal output based on an input condition of a signal during an input time interval; and signal output means for outputting, based on the index value, a signal during an output time interval that starts after the input time ends. The learning means learns a weighting coefficient for the signal.

According to a third example aspect of the present disclosure, a spiking neuron model apparatus includes index value calculation means for varying an index value of a signal output based on an input condition of a signal during an input time interval; and signal output means for outputting, based on the index value, a signal during an output time interval that starts after the input time interval ends.

According to a fourth example aspect of the present disclosure, a computation method includes: varying an index value of a signal output based on an input condition of a signal during an input time interval; and outputting, based on the index value, a signal during an output time interval that starts after the input time interval ends.

According to a fifth example aspect of the present disclosure, a non-transitory recording medium stores a program that causes a programmable apparatus to execute: varying an index value of a signal output based on an input condition of a signal during an input time interval; and outputting, based on the index value, a signal during an output time interval that starts after the input time interval ends.

According to the present disclosure, a spiking neural network can efficiently perform data processing.

EXAMPLE EMBODIMENT

Hereinafter, example embodiments of the present disclosure will be explained. However, the example embodiments below should not be construed as limiting the disclosure according to the claims. Additionally, not all combinations of the characteristics explained in the example embodiments are necessarily essential for the solution provided by the disclosure.

Figure 1:
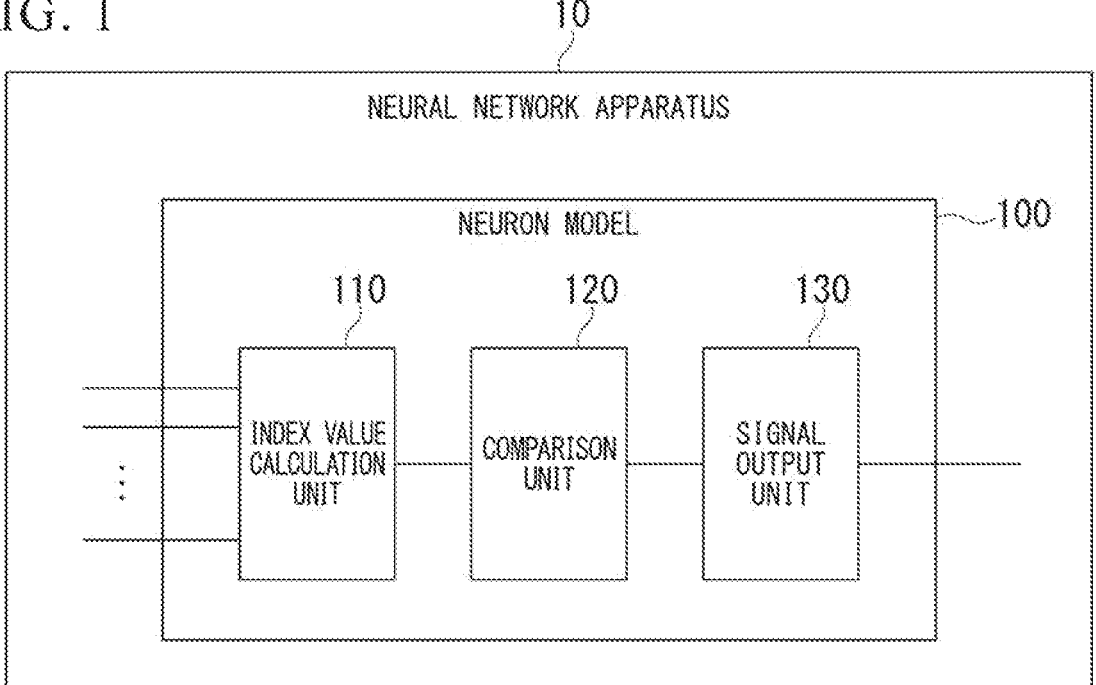
FIG. 1 is a diagram illustrating an example of the structure of a neural network apparatus according to an example embodiment.

FIG. 1 is a diagram illustrating an example of the structure of a neural network apparatus according to an example embodiment. In the structure illustrated in FIG. 1, a neural network apparatus 10 includes a neuron model 100. The neuron model 100 includes an index value calculation unit 110, a comparison unit 120 and a signal output unit 130.

The neural network apparatus 10 performs data processing by using a spiking neural network. Data processing will also be referred to as computation. The neural network apparatus 10 is an example of a computation apparatus.

The neural network apparatus mentioned here is an apparatus on which a neural network is implemented. A spiking neural network may be implemented in the neural network apparatus 10 by using hardware dedicated thereto. For example, a spiking neural network may be implemented on the neural network apparatus 10 by using an ASIC (Application-Specific Integrated Circuit) or an FPGA (Field-Programmable Gate Array). Alternatively, the spiking neural network may be implemented on the neural network apparatus 10 by software using a computer or the like.

An apparatus including an ASIC, an apparatus including an FPGA and a computer are all examples of a programmable apparatus. With an ASIC or an FPGA, an example of programming is to use a hardware description language to describe hardware, and to realize the described hardware on the ASIC or the FPGA. In the case in which the neural network apparatus 10 is formed by using a computer, the functions of a spiking neural network may be described by programming, and the resulting program may be executed on the computer.

The spiking neural network mentioned here is a neural network in which neuron models output signals at timings that are based on state amounts known as membrane potentials, which undergo time variations in accordance with input conditions of signals to the neuron models themselves. The membrane potentials will also be referred to as signal output index values, or simply as index values.

The time variations mentioned here refer to variations over time.

The neuron models in the spiking neural network will also be referred to as spiking neuron models. The signals output by the spiking neuron models will also be referred to as spike signals or as spikes. In the spiking neural network, binary signals can be used as the spike signals, and information may be transmitted between spiking neuron models by the transmission timings of spike signals, by the number of spike signals or the like.

In the case of a neuron model 100, the index value calculation unit 110 calculates membrane potentials based on the input conditions of spike signals to the neuron model 100. The signal output unit 130 outputs spike signals at timings in accordance with the time variation in the membrane potentials.

The spike signals used in the neural network apparatus 10 may be, but are not limited to being, pulse signals or step signals.

Hereinafter, a time-based scheme in which information is transmitted by means of the transmission timings of spike signals will be used as the scheme for transmitting information between the neuron models 100 in the spiking neural network by means of the neural network apparatus 10.

The processing performed by the neural network apparatus 10 may be various processes that can be executed by using the spiking neural network. For example, the neural network apparatus 10 may perform, but is not limited to performing, image recognition, biometric authentication or numerical prediction.

The neural network apparatus 10 may be formed as a single apparatus, or may be formed by combining multiple apparatuses. For example, each neuron model 100 may be formed as an apparatus, and the apparatuses formed from these individual neuron models 100 may be connected by signal transmission paths to form the spiking neural network.

Figure 2:
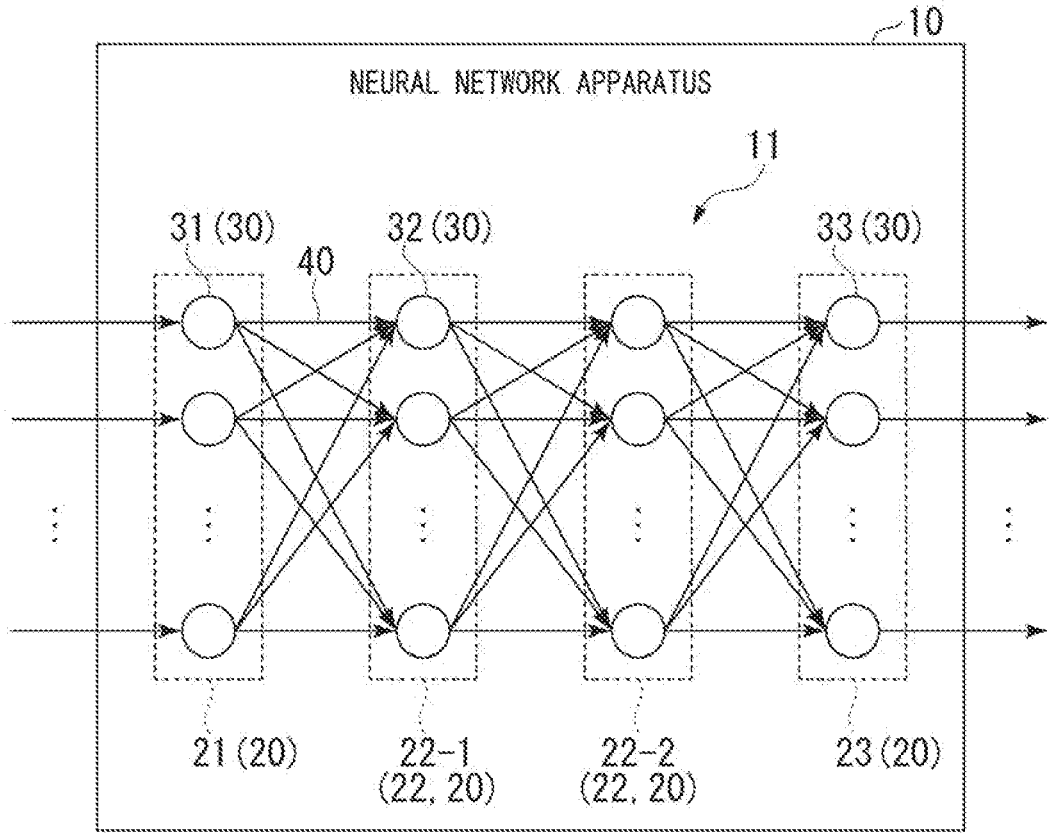
FIG. 2 is a diagram illustrating an example of the structure of a spiking neural network provided in a neural network apparatus according to the example embodiment.

FIG. 2 is a diagram illustrating an example of the structure of a spiking neural network provided in the neural network apparatus 10. The spiking neural network provided in the neural network apparatus 10 will also be described as a neural network 11. Additionally, the neural network 11 will also be referred to as a neural network body.

In the example in FIG. 2, the neural network 11 is formed as a feedforward four-layer spiking neural network. Specifically, the neural network 11 includes an input layer 21, two intermediate layers 22-1 and 22-2, and an output layer 23. The two intermediate layers 22-1 and 22-2 will also be described collectively as intermediate layers 22. The intermediate layers will also be referred to as hidden layers. The input layer 21, the intermediate layers 22 and the output layer 23 will also be described collectively as layers 20.

The input layer 21 includes input nodes 31. The intermediate layers 22 include intermediate nodes 32. The output layer 23 includes output nodes 33. The input nodes 31, the intermediate nodes 32 and the output nodes 33 will also be described collectively as nodes 30.

The input nodes 31, for example, convert input data to the neural network 11 into spike signals. Alternatively, in the case in which the input data to the neural network 11 are indicated by spike signals, the neuron models 100 may be used as the input nodes 31.

Neuron models 100 may be used for both the intermediate nodes 32 and the output nodes 33. Additionally, the operations of the neuron models 100 may differ between the intermediate nodes 32 and the output nodes 33, such as the constraint conditions placed on the signal output timings, to be described below, being more relaxed for the output nodes 33 than for the intermediate nodes.

The four layers 20 of the neural network 11 are arranged, from the upstream side in terms of signal transmission, in the order of the input layer 21, the intermediate layer 22-1, the intermediate layer 22-2 and the output layer 23. Between two adjacent layers 20, the nodes 30 are connected by transmission paths 40. The transmission paths 40 transmit spike signals from the nodes 30 of an upstream-side layer 20 to the nodes 30 of a downstream-side layer 20.

However, in the case in which the neural network 11 is formed as a feedforward spiking neural network, the number of layers is not limited to four, and there simply need to be two or more layers. Additionally, the number of neuron models 100 provided in each layer is not limited to a specific number, and each layer simply needs to be provided with one or more neuron models 100. Each layer may be provided with the same number of neuron models 100, or a different number of neuron models 100 may be provided depending on the layer. Additionally, the transmission destinations of the spike signals from each layer are not limited to being the next layer. The output from a certain layer may skip over an arbitrary number of layers and be transmitted to a later-stage layer.

Additionally, the neural network 11 may be, but is not limited to being, configured as a fully connected type. In the example in FIG. 2, all of the neuron models 100 in an earlier-stage layer 20 of mutually adjacent layers may be connected, by transmission paths 40, to all of the neuron models 100 in the later-stage layer 20. However, there may be cases in which some of neuron models 100 in mutually adjacent layers are not connected by transmission paths 40.

Hereinafter, the disclosure will be described under the assumption that the delay time for transmission of the spike signals can be ignored, so that the spike signal output times from the neuron models 100 on the spike signal output side are the same as the spike signal input times at the neuron models 100 on the spike signal input side. If the delay time for transmission of the spike signals cannot be ignored, then times obtained by adding the delay time to the spike signal output times may be used as the spike signal input times.

In a general spiking neuron model, the output timings of spike signals are not restricted, and spike signals are output at timings at which time-varying membrane potentials attain (reach) threshold values. In a spiking neural network based on spiking neuron models in which the output timings of spike signals are not restricted, if there are multiple items of data to be processed, then there is a need to wait until the spiking neural network has received inputs of input data and output computation results before the next input data can be input to the spiking neural network.

Figure 3:
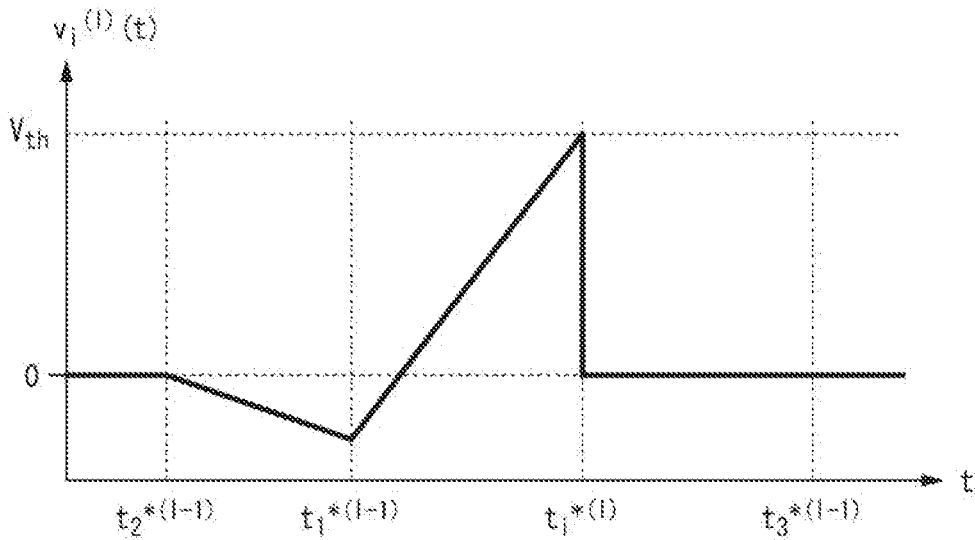
FIG. 3 is a diagram illustrating an example of the time variation in the membrane potential in a spiking neuron model in which the output timings of spike signals are not restricted according to the example embodiment.

FIG. 3 is a diagram illustrating an example of the time variation in the membrane potential in a spiking neuron model in which the output timings of spike signals are not restricted. The horizontal axis in the graph in FIG. 3 represents the time. The vertical axis represents the membrane potential.

FIG. 3 illustrates an example of the membrane potential of the spiking neuron model that is the i-th node in the l-th layer. The membrane potential in the spiking neuron model that is the i-th node in the l-th layer at the time t is represented by $v_i^{(l)}(t)$. In the explanation of FIG. 3, the spiking neuron model in the i-th node of the l-th layer will also be referred to as the target model.

In the example in FIG. 3, the target model receives inputs of spike signals from three spiking neuron models.

The time $t_2^{*(l-1)}$ represents the input time of a spike signal from the second spiking neuron model in the (l−1)-st layer. The time $t_1^{*(l-1)}$ represents the input time of a spike signal from the first spiking neuron model in the (l−1)-st layer. The time $t_3^{*(l-1)}$ represents the input time of a spike signal from the third spiking neuron model in the (l−1)-st layer.

Additionally, the target model outputs a spike signal at the time $t_1^{*(l)}$. The spiking neuron model outputting a spike signal is referred to as firing. The time at which a spiking neuron model fires is referred to as the firing time.

In the example in FIG. 3, the initial value of the membrane potential is 0. The initial value of the membrane potential corresponds to the resting membrane potential.

Before the target model fires, after a spike signal is input, the membrane potential $v_i^{(l)}(t)$ of the target model continuously varies at a variation rate (variation speed) in accordance with a weighting set for each spike signal transmission path. Additionally, the variation rate of the membrane potential for each spike signal input is added linearly. The equation for the derivative of the membrane potential $v_i^{(l)}(t)$ in the example in FIG. 3 is represented by Expression (1).

(Expression (1))

$$\frac{d}{dt}v_i^{(l)}(t) = \sum_j w_{ij}^{(l)}\theta\left(t - t_j^{*(l-1)}\right) \tag{1}$$

$w_{ij}^{(l)}$ represents the weighting set for the spike signal transmission path from the j-th spiking neuron model in the (l−1)-th layer to the target model. The weighting $w_{ij}^{(l)}$ is a target to be learned.

θ represents a step function and is represented by Expression (2).

(Expression (2))

$$\theta(x) = \begin{cases} 0, & (x < 0) \\ 1, & (x \geq 0) \end{cases} \tag{2}$$

At the time $t_i^{*(l)}$, the membrane potential $v_i^{(l)}(t)$ of the target model attains the firing threshold value $V_{th}$, and the target model fires. The firing causes the membrane potential $v_i^{(l)}(t)$ of the target model to become 0, and thereafter, the membrane potential does not vary even when a spike signal is input to the target model.

Figure 4:
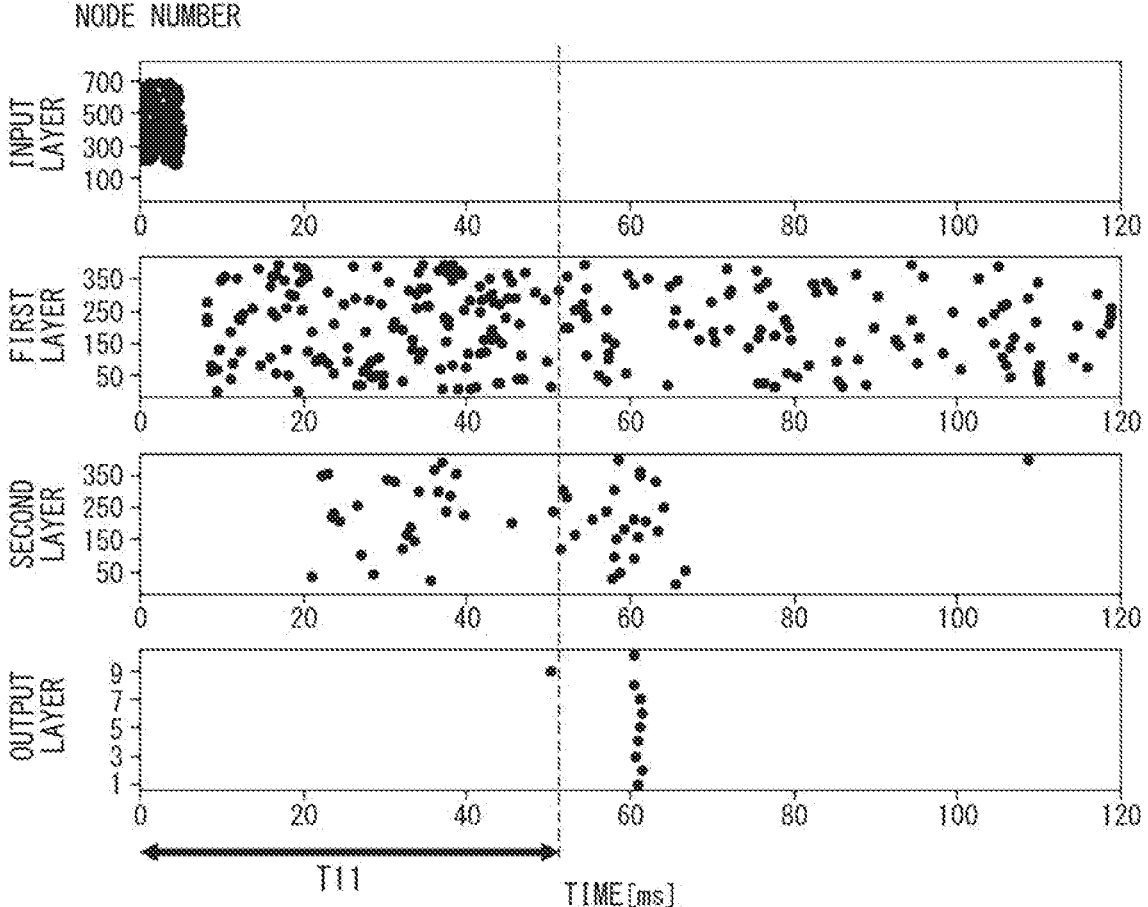
FIG. 4 is a diagram illustrating an example of the output timings of spike signals from spiking neuron models in a spiking neural network in the case in which the output timings of the spike signals from the spiking neuron models are not restricted according to the example embodiment.

FIG. 4 is a diagram illustrating an example of the output timings of spike signals from spiking neuron models in a spiking neural network in the case in which the output timings of the spike signals from the spiking neuron models are not restricted.

The horizontal axis in FIG. 4 represents the time in terms of the elapsed time from the moment data start being input to the spiking neural network. The vertical axis represents node numbers in each of the input layer, the first layer, the second layer and the output layer. The node numbers in each layer are used as identification numbers for identifying spiking neuron models in the layer.

In the example in FIG. 4, the spiking neuron models in the input layer fire within a time period of approximately 5 milliseconds from the moment data start being input to the spiking neural network. In contrast therewith, the firing timings of the spiking neuron models in the first layer are scattered within a range from approximately 10 milliseconds to approximately 120 milliseconds in terms of the elapsed time from the moment data start being input to the spiking neural network. The firing timings of the spiking neuron models in the second layer are scattered within a range from approximately 20 milliseconds to approximately 70 milliseconds in terms of the elapsed time from the moment data start being input to the spiking neural network.

Generally, it is difficult to know in real time, during the processing in a spiking neural network, the firing timings of the spiking neural network and which of the firing spiking neuron models in the first layer and the second layer are affecting the firing of the spiking neuron models in the output layer.

For this reason, though it also depends on the scheme of the spiking neural network, there is a need to wait for at least the time period T11, until the spiking neuron models first fire in the output layer, before inputting the next input data to the spiking neural network.

In contrast therewith, in the case in which there are multiple items of input data, if the next input data can be input to the spiking neural network before the computation results for one item of input data are obtained, then the time period from when the first input data are input to the spiking neural network until the computation results for the final input data are obtained can be made relatively shorter, and on this point, the throughput of the spiking neural network can be increased.

Therefore, in the neural network apparatus 10, a data processing period is set for the neuron models 100, and the neuron models 100 are made to complete data processing within the data processing period. As a result thereof, after the data processing period has elapsed, the next item of data can be input to the neuron models 100.

Figure 5:
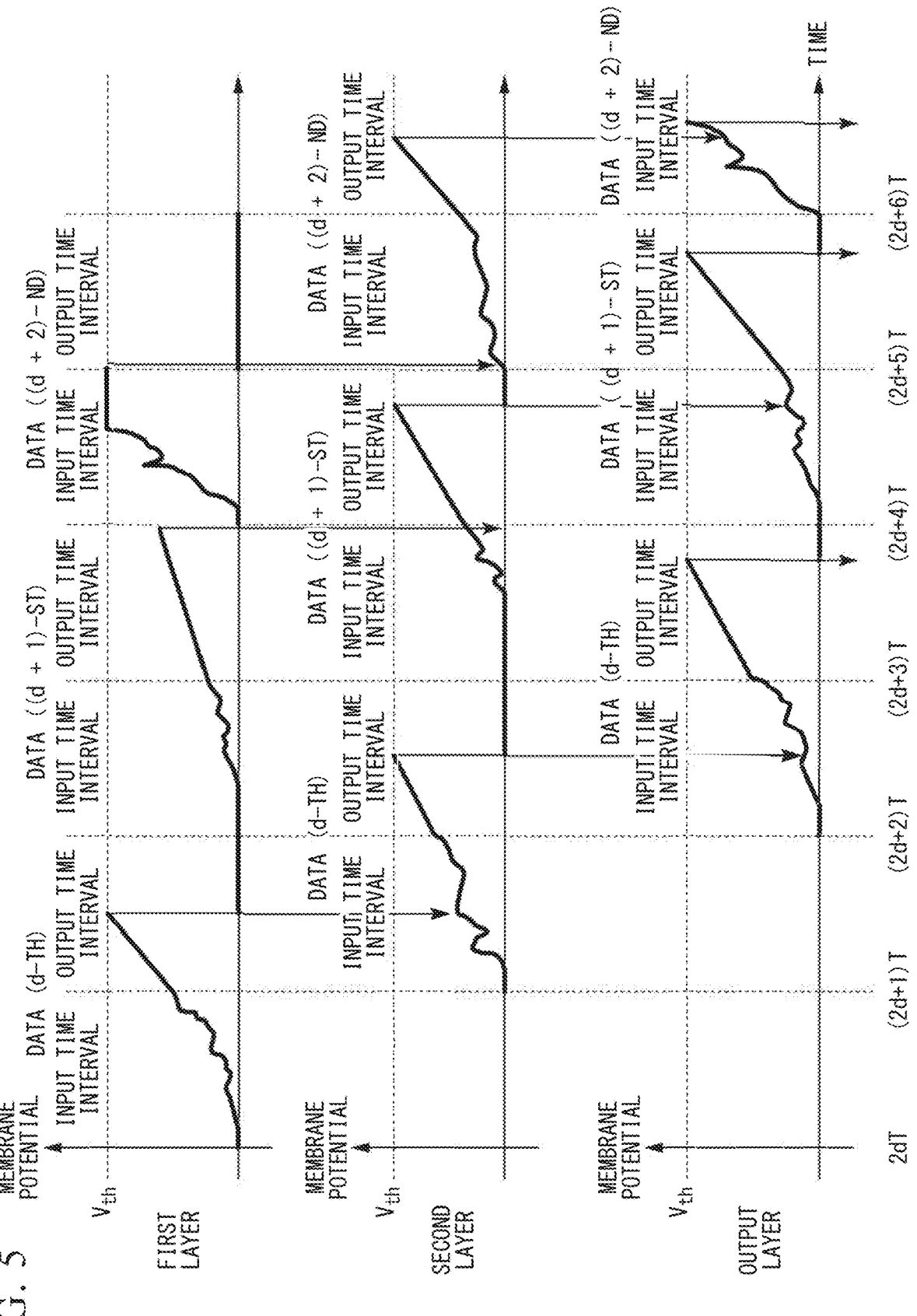
FIG. 5 is a diagram illustrating an example of spike signal transfer timings between neuron models in a neural network apparatus according to the example embodiment.

FIG. 5 is a diagram illustrating an example of spike signal transfer timings between the neuron models 100 in the neural network apparatus 10. FIG. 5 illustrates examples of the time variation in the membrane potentials and the firing timings based on those membrane potentials for each neuron model 100 in a spike signal transfer relationship in each of the first layer to the third layer in the neural network 11. In the example in FIG. 5, the third layer is the output layer.

The horizontal axis in the graph in FIG. 5 represents time in terms of the elapsed time from the moment input data are first input to the first layer. The vertical axis represents the membrane potentials in each of the neuron models 100 from the first layer to the third layer.

In the example in FIG. 5, the data processing periods that are set in the neuron models 100 are composed of combinations of input time intervals and output time intervals. The input time intervals are time intervals during which the neuron models 100 receive spike signal inputs. The output time intervals are time intervals during which the neuron models 100 output spike signals.

The neural network apparatus 10 synchronizes the neuron models 100 in each layer and sets the same input time intervals and the same output time intervals so that data processing periods of the same time width are set at the same timings in all of the neuron models 100 included in the same layer.

Additionally, the neural network apparatus 10 is also synchronized between layers so that the output time intervals of the neuron models 100 in a certain layer overlap with the input time intervals of the neuron models 100 in the next layer.

In particular, the input time intervals and the output time intervals are set so that the durations of the input time intervals and the durations of the output time intervals are the same, and the output time intervals of the neuron models 100 in a certain layer completely overlap with the input time intervals of the neuron models 100 in the next layer.

In this case, the "neuron models 100 in a certain layer" are an example of the first neuron models. The "neuron models 100 in the next layer" are an example of the second neuron models. The output time intervals and the input time intervals are set so that the output time intervals of the first neuron models overlap with the input time intervals of the second neuron models that receive spike signal inputs from the first neuron models.

Since the time periods at which the spike signals are input to a neuron model 100 are limited to the input time intervals, the index value calculation unit 110 calculates the membrane potentials so that the membrane potentials are time-varied based on the input conditions of the spike signals during the input time intervals. The index value calculation unit 110 is an example of index value calculation means.

Hereinafter, as explained in connection with the spiking neural network by referring to Expression (1) and Expression (2), the neuron model 100 that is the i-th node in the l-th layer will be referred to as the target model, and the membrane potential of the target model will be represented by $v_i^{(l)}(t)$. Additionally, the weighting set on the spike signal transmission path from the j-th spiking neuron model in the (l−1)-st layer to the target model will be represented by $w_{ij}^{(l)}$.

The explanations regarding the neuron models 100 that are target models apply to all of the neuron models 100 provided in the neural network apparatus 10, apart from the fact that the output timings of the spike signals from the neuron models 100 in the output layer may be relaxed, as will be described below. In other words, the l-th layer may be any layer including neuron models 100 as nodes. Any of the neuron models 100 in the l-th layer may be the i-th neuron model 100.

The index value calculation unit 110 calculates the membrane potential $v_i^{(l)}(t)$, the equation for the derivative of which is represented by Expression (1), until the earlier event of Event (1) or (2) occurs. Event (1) is an event in which the membrane potential $v_i^{(l)}(t)$ attains the threshold value $V_{th}$. Event (2) is an event in which the data processing period elapses. The membrane potential $v_i^{(l)}(t)$ is represented by Expression (3).

(Expression (3))

$$v_i^{(l)}(t) = \sum_j w_{ij}^{(l)}\left(t - t_j^{*(l-1)}\right)\theta\left(t - t_j^{*(l-1)}\right) \tag{3}$$

The index value calculation unit 110 may calculate the membrane potential based on Expression (3).

During input time intervals, the index value calculation unit 110 varies the membrane potential $v_i^{(l)}(t)$ at a variation speed in accordance with the input conditions of spike signals to the target models, as indicated by Expression (1).

On the other hand, during output time intervals, spike signals are not input to the target models. For this reason, if the membrane potential $v_i^{(l)}(t)$ did not attain the threshold value $V_{th}$ during an input time interval, then during the output time interval, the index value calculation unit 110 varies the membrane potential $v_i^{(l)}(t)$ by maintaining the variation speed at the end of the input time interval.

When the time at which the membrane potential $v_i^{(l)}(t)$ attains the threshold value $V_{th}$ is represented by $t_i^{(l,\ vth)}$ and is substituted for the time t in Expression (3), Expression (4) is obtained.

(Expression (4))

$$V_{th} = v_i^{(l)}\left(t_i^{(l,vth)}\right) = \sum_{j \in \Gamma_i^{(l)}} w_{ij}^{(l)}\left(t_i^{(l,vth)} - t_j^{*(l-1)}\right) \tag{4}$$

$\Gamma_i^{(l)}$ represents the set of indices j for which "$t_j^{*(l-1)} < t_i^{(l,\ vth)}$" is satisfied.

In the neural network apparatus 10, the firing times are restricted to occur only during the output time intervals. Therefore, there are cases in which the firing time $t_i^{*(l)}$ is a time later than the time at which the threshold value $V_{th}$ is attained. Since there are cases in which the time at which the membrane potential $v_i^{(l)}(t)$ attains the threshold value $V_{th}$ is different from the firing time $t_i^{*(l)}$, the times at which the membrane potential $v_i^{(l)}(t)$ attains the threshold value $V_{th}$ are represented by $t_i^{(l,\ vth)}$. The times at which the membrane potential attains the threshold value will also be referred to as threshold value attainment times.

From Expression (4), the threshold value attainment times $t_i^{(l,\ vth)}$ can be expressed as in Expression (5).

(Expression (5))

$$t_i^{(l,vth)} = \frac{V_{th} + \sum_{j \in \Gamma_i^{(l)}} w_{ij}^{(l)} t_j^{*(l-1)}}{\sum_{j \in \Gamma_i^{(l)}} w_{ij}^{(l)}} \quad (5)$$

The comparison unit 120 compares the membrane potential $v_i^{(l)}(t)$ with the threshold value $V_{th}$ and determines whether or not the membrane potential $v_i^{(l)}(t)$ has attained the threshold value $V_{th}$.

The signal output unit 130 outputs spike signals during the output time intervals based on the membrane potential $v_i^{(l)}(t)$. Specifically, if the membrane potential $v_i^{(l)}(t)$ attains the threshold value $V_{th}$ during an input time interval, then the signal output unit 130 outputs a spike signal at the start of the output time interval. If the membrane potential $v_i^{(l)}(t)$ attains the threshold value $V_{th}$ during an output time interval, then the signal output unit 130 outputs a spike signal when the membrane potential $v_i^{(l)}(t)$ attains the threshold value $V_{th}$. If the membrane potential $v_i^{(l)}(t)$ does not attain the threshold value $V_{th}$ during an output time interval, then the signal output unit 130 outputs a spike signal at the end of the output time interval.

Regarding the output layer in the example in FIG. 5, since there is no counterpart to which the spike signals are to be transferred, spikes can be output even during time intervals corresponding to input time intervals. The time intervals corresponding to the input time intervals in this case will also be referred to as input/output time intervals.

In cases in which the membrane potential $v_i^{(l)}(t)$ has attained the threshold value $V_{th}$ during an input time interval, the index value calculation unit 110 may compute the membrane potential $v_i^{(l)}(t)$ as being equal to the threshold value $V_{th}$ until the output time interval starts. As a result thereof, the comparison unit 120 determines that the membrane potential $v_i^{(l)}(t)$ has attained the threshold value $V_{th}$ at the start of the output time interval. The signal output unit 130 outputs a spike signal at the start of the output time interval based on the determination results from the comparison unit 120.

Additionally, in this case, after the comparison unit 120 has determined that the membrane potential $v_i^{(l)}(t)$ has attained the threshold value $V_{th}$ at the start of the output time interval, the index value calculation unit 110 may calculate the membrane potential $v_i^{(l)}(t)$ to be 0 until the next input time interval starts. As a result thereof, the index value calculation unit 110 may start processing the next data in the next input time interval from a state in which the membrane potential $v_i^{(l)}(t)$ has been reset to 0.

In the case in which the membrane potential $v_i^{(l)}(t)$ attains the threshold value $V_{th}$ during an output time interval, the comparison unit 120 determines that the membrane potential $v_i^{(l)}(t)$ has attained the threshold value $V_{th}$. The signal output unit 130 outputs a spike signal based on the determination result from the comparison unit 120. As a result thereof, the signal output unit 130 outputs a spike signal at the timing at which the membrane potential $v_i^{(l)}(t)$ attains the threshold value $V_{th}$.

In this case also, after the comparison unit 120 has determined that the membrane potential $v_i^{(l)}(t)$ has attained the threshold value $V_{th}$, the index value calculation unit 110 may calculate the membrane potential $v_i^{(l)}(t)$ to be 0 until the start of the next input time interval. As a result thereof, the index value calculation unit 110 may start processing the next data in the next input time interval from a state in which the membrane potential $v_i^{(l)}(t)$ has been reset to 0.

In the case in which the membrane potential $v_i^{(l)}(t)$ does not attain the threshold value $V_{th}$ by the end of an output time interval, the index value calculation unit 110 or the comparison unit 120 may make the signal output unit 130 output a spike signal at the end of the output time interval. The spike signal output in this case will also be referred to as a forced firing.

For example, in the case in which the membrane potential $v_i^{(l)}(t)$ does not attain the threshold value $V_{th}$ even once by the end of an output time interval, the comparison unit 120 may output a dummy determination result indicating that the membrane potential has attained the threshold value. Furthermore, the signal output unit 130 may output a spike signal at the end of the output time interval based on the determination result from the comparison unit 120.

In the case in which the membrane potential $v_i^{(l)}(t)$ does not attain the threshold value $V_{th}$ by the end of an output time interval, the index value calculation unit 110 may calculate the membrane potential $v_i^{(l)}(t)$ to be 0 at the start of the next input time interval. As a result thereof, the index value calculation unit 110 may start processing the next data in the next input time interval from a state in which the membrane potential $v_i^{(l)}(t)$ has been reset to 0.

Figure 6:
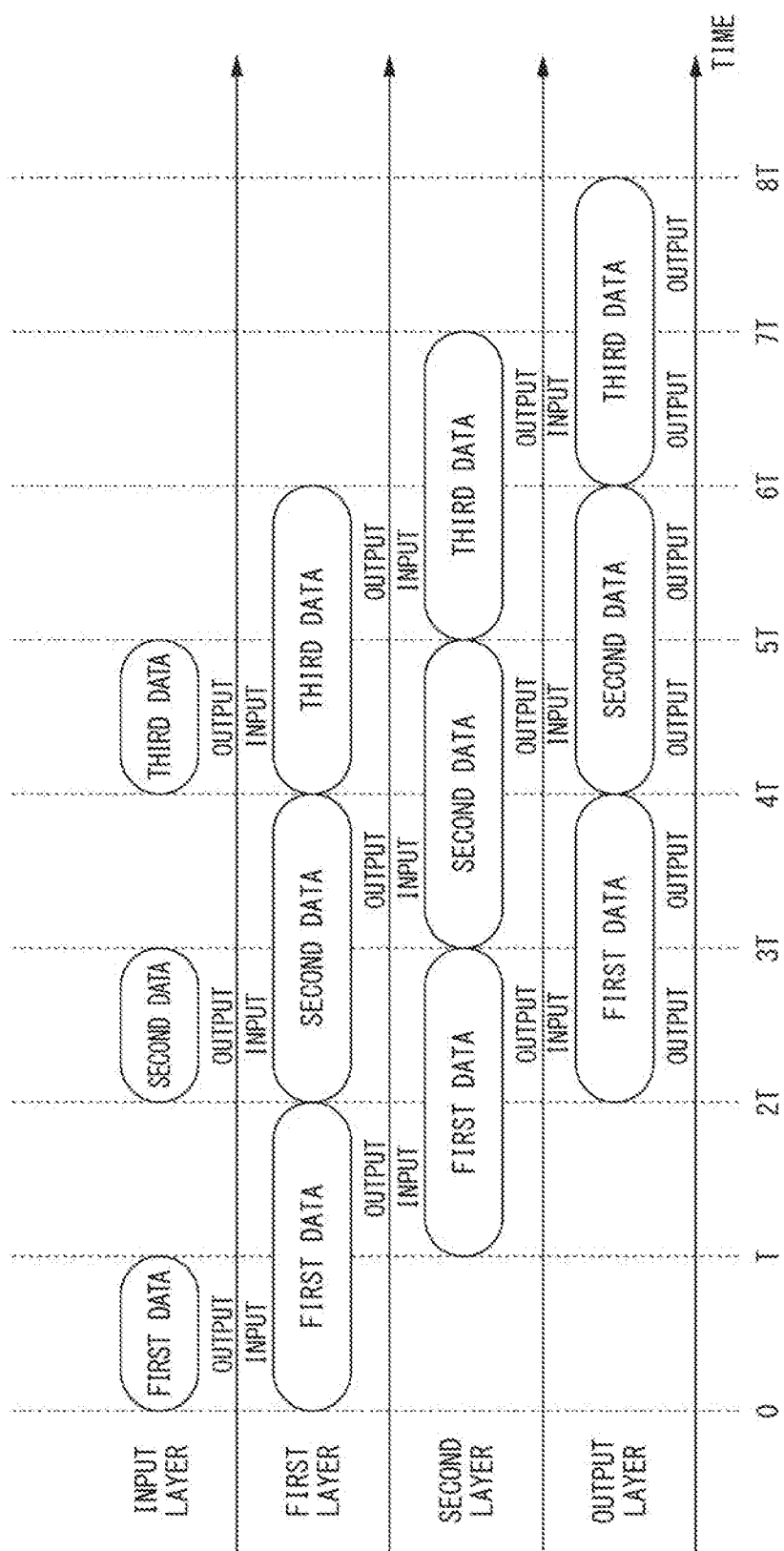
FIG. 6 is a diagram illustrating an example of the setting of time intervals according to the example embodiment.

FIG. 6 is a diagram illustrating an example of the setting of time intervals. The horizontal axis in FIG. 6 represents the time in terms of the elapsed time from the moment data start being input to the neural network 11. The input and output of data between layers is performed by inputting and outputting spike signals.

In the example in FIG. 6, the time indicated on the horizontal axis is divided into time intervals each having the duration T. Additionally, FIG. 6 indicates the types of time intervals for each of the input layer, the first layer, the second layer and the output layer. Specifically, input time intervals are labeled "Input" and output time intervals are labeled "Output". Additionally, input/output time intervals are labeled as both "Input" and "Output". In the example in FIG. 6, the output layer will also be referred to as the third layer.

Additionally, FIG. 6 indicates an example of the case in which the neural network 11 processes three items of data, namely, first data, second data and third data. For each layer, the time intervals during which the respective items of data are processed in that layer are indicated.

In the example in FIG. 6, all of the neuron models 100 in the first layer, the second layer and third layer operate so as to complete data processing within a data processing period including one input time interval and one output time interval following that input time interval. Specifically, in each neuron model 100, if the membrane potential $v_i^{(l)}(t)$ does not attain the threshold value $V_{th}$ by the end of the output time interval, then a spike signal is output and the processing ends.

As a result thereof, the neuron models 100 can process the next data within the next data processing period. In the neural network 11 as a whole, the next data can begin to be processed without waiting for the processing of the input data to be completed, as in so-called pipeline processing.

Additionally, in the example in FIG. 6, the neural network apparatus 10 synchronizes the layers and synchronizes the neuron models 100 within each layer so that the output time intervals of the layers on the sides outputting spike signals coincide with the input time intervals of the layers on the sides receiving the inputs of those spike signals. In other words, the neural network apparatus 10 synchronizes the layers and synchronizes the neuron models 100 within each layer so that the output time intervals of the layers on the sides outputting spike signals completely overlap with the input time intervals of the layers on the sides receiving the inputs of those spike signals.

The neural network apparatus 10 may include a synchronization processing unit and the synchronization processing unit may notify the respective neuron models 100 of the timings at which the time intervals are to be switched. Alternatively, each neuron model 100 may detect the timings for switching between time intervals based on clock signals that are common to all of the neuron models 100.

In the example in FIG. 6, the processing by which the i-th neuron model 100 in the l-th layer outputs spike signals during an output time interval by processing first data can be expressed as in Expression (6).

(Expression (6))

$$t_i^{(l)} = \text{clip}\left(t_i^{(l,vth)}, lT, (l+1)T\right) \tag{6}$$

The function "clip" can be expressed as in Expression (7).

(Expression (7))

$$clip(x, a, b) = \begin{cases} a & \text{when } x < a \\ x & \text{when } a \le x < b \\ b & \text{when } b \le x \end{cases} \tag{7}$$

The function "clip" expressed by Expression 7 will be referred to as a clip function.

Figure 7:
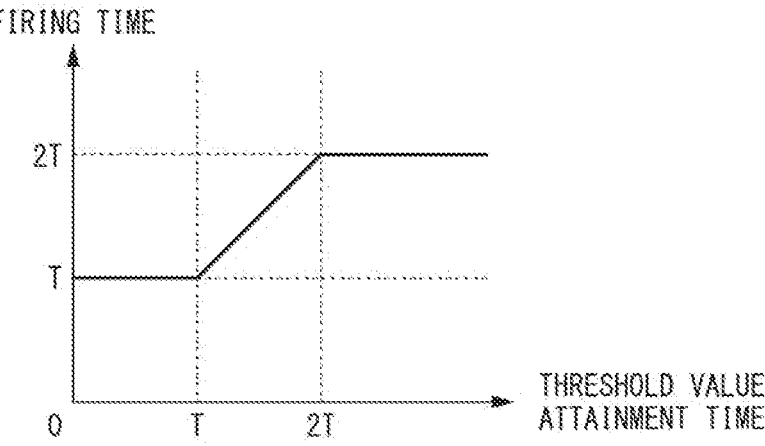
FIG. 7 is a diagram illustrating a first example of a clip function according to the example embodiment.

FIG. 7 is a diagram illustrating a first example of a clip function. FIG. 7 indicates an example of a clip function when a neuron model 100 in the first layer in the example in FIG. 6 processes first data.

The horizontal axis in the graph in FIG. 7 represents the time at which the membrane potential $v_i^{(l)}(t)$ attains the threshold value $V_{th}$ in terms of the elapsed time from the moment data start being input to the neural network 11. The vertical axis represents the time at which the neuron model 100 outputs a spike signal in terms of the elapsed time from the moment data start being input to the neural network 11. Both the horizontal axis and the vertical axis in FIG. 7 correspond to the horizontal axis in FIG. 6.

As illustrated in FIG. 7, in the case in which the threshold value attainment time $t_i^{(l,\ vth)}$ is earlier than the time T, the neuron model 100 outputs the spike signal at the time T. The time T is the time at which an output time interval starts.

In the case in which the threshold value attainment time $t_i^{(l,\ vth)}$ occurs within the interval from the time T to 2T, the neuron model 100 outputs a spike signal at the threshold value attainment time $t_i^{(l,\ vth)}$. The time 2T is the time at which the output time interval ends. It is assumed that the delay time from when the membrane potential $v_i^{(l)}(t)$ attains the threshold value $V_{th}$ until the neuron model 100 outputs the spike signal can be ignored.

In the case in which the threshold value attainment time $t_i^{(l,\ vth)}$ is later than the time 2T, i.e., if the membrane potential $v_i^{(l)}(t)$ does not attain the threshold value $V_{th}$ by the time 2T, then the neuron model 100 outputs the spike signal at the time 2T.

The processing by which the i-th neuron model 100 in the l-th layer outputs spike signals during an output time interval by processing the d-th data in the example in FIG. 6 can be expressed as in Expression (8).

(Expression (8))

$$t_i^{*(l)} = \text{clip}\left(t_i^{(l,vth)}, (2d+l-2)lT, (2d+l-1)T\right) \tag{8}$$

Figure 8:
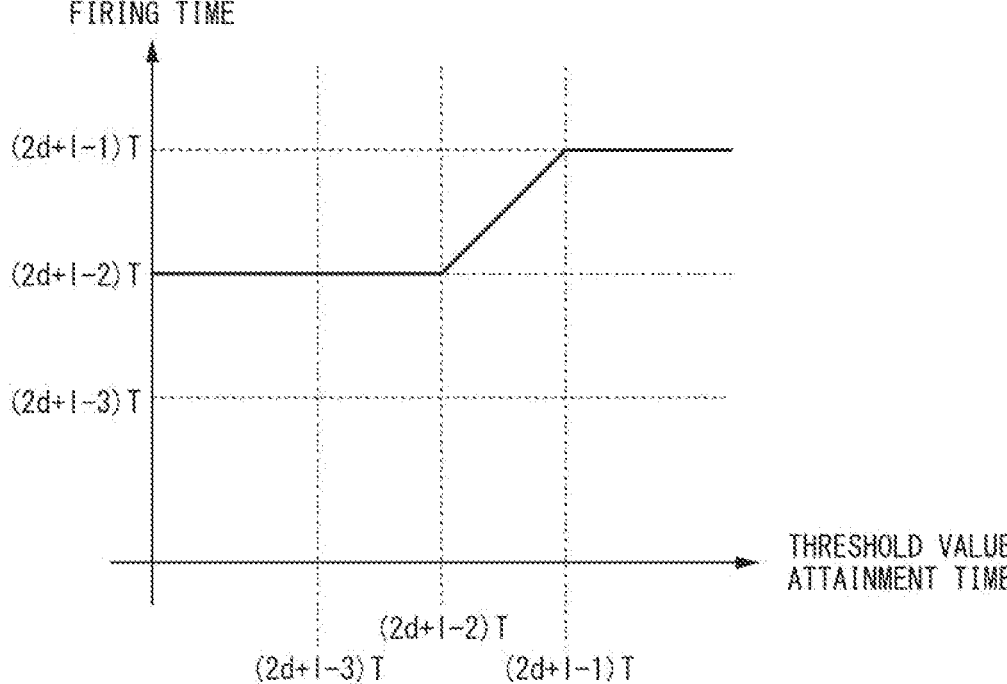
FIG. 8 is a diagram illustrating a second example of a clip function according to the example embodiment.

FIG. 8 is a diagram illustrating a second example of a clip function. FIG. 8 is a generalization of the example in FIG. 7. Specifically, FIG. 8 illustrates an example of a clip function used when a neuron model 100 in the l-th layer processes the d-th data in the example in FIG. 6.

The horizontal axis in the graph in FIG. 8 represents the time at which the membrane potential $v_i^{(l)}(t)$ attains the threshold value $V_{th}$ in terms of the elapsed time from the moment data start being input to the neural network 11. The vertical axis represents the time at which the neuron model 100 outputs a spike signal in terms of the elapsed time from the moment data start being input to the neural network 11. Both the horizontal axis and the vertical axis in FIG. 8 correspond to the horizontal axis in FIG. 6.

As illustrated in FIG. 8, in the case in which the threshold value attainment time $t_i^{(l,\ vth)}$ is earlier than the time $(2d+l-2)T$, the neuron model 100 outputs the spike signal at the time $(2d+l-2)T$. The time $(2d+l-2)T$ is the starting time of an output time interval.

In the case in which the threshold value attainment time $t_i^{(l,\ vth)}$ occurs within the interval from the time $(2d+l-2)T$ to $(2d+l-1)T$, the neuron model 100 outputs a spike signal at the threshold value attainment time $t_i^{(l,\ vth)}$. The time $(2d+l-1)T$ is the ending time of an output time interval. It is assumed that the delay time from when the membrane potential $v_i^{(l)}(t)$ attains the threshold value $V_{th}$ until the neuron model 100 outputs the spike signal can be ignored.

In the case in which the threshold value attainment time $t_i^{(l,\ vth)}$ occurs later than the time $(2d+l-1)T$, i.e., if the membrane potential $v_i^{(l)}(t)$ does not attain the threshold value $V_{th}$ by the time $(2d+l-1)T$, then the the neuron model 100 outputs a spike signal at the time $(2d+l-1)T$.

The clip functions in the neuron models 100 can be considered to correspond to activation functions in an artificial neural network (ANN). Therefore, the neural network 11 can be considered to introduce the concept of activation functions into a spiking neural network. For this reason, the neural network apparatus 10 can be expected to exhibit high recognition performance.

Additionally, the clip functions in the neuron models 100 may be the learning targets.

Figure 9:
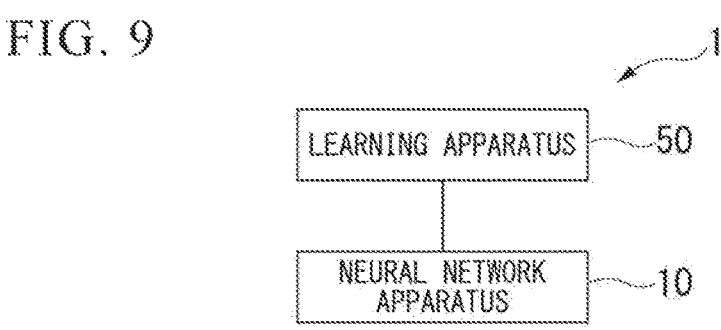
FIG. 9 is a diagram illustrating an example of the system structure when learning according to the example embodiment.

FIG. 9 is a diagram illustrating an example of the system structure when learning. In the structure illustrated in FIG. 9, the neural network system 1 includes a neural network apparatus 10 and a learning apparatus 50. The neural network apparatus 10 and the learning apparatus 50 may be integrated in a single apparatus. Alternatively, the neural network apparatus 10 and the learning apparatus 50 may be arranged to be separate apparatuses.

As mentioned above, the neural network 11 formed by the neural network apparatus 10 will also be referred to as a neural network body.

Figure 10:
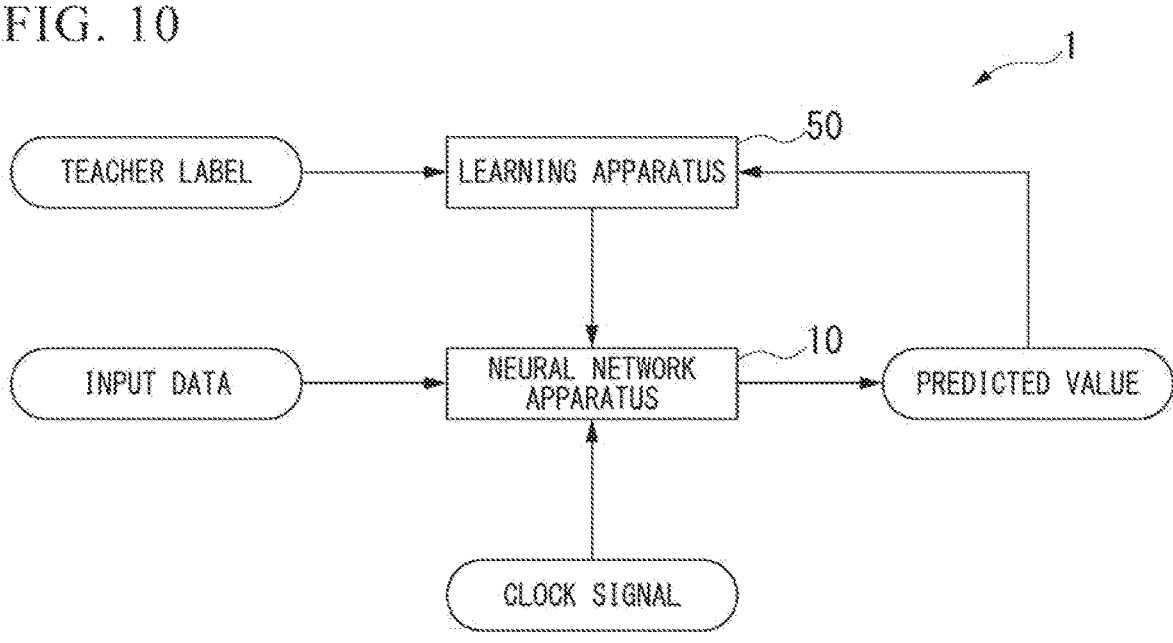
FIG. 10 is a diagram illustrating an example of input and output of signals in a neural network system according to the example embodiment.

FIG. 10 is a diagram illustrating an example of input and output of signals in the neural network system 1.

In the example in FIG. 10, input data and teacher labels indicating correct answers to the input data are input to the neural network system 1. The neural network apparatus 10 may receive inputs of input data and the learning apparatus 50 may receive inputs of the teacher labels. Combinations of the input data and the teacher labels constitute examples of training data in supervised learning.

Additionally, the neural network apparatus 10 acquires clock signals. The neural network apparatus 10 may include a clock circuit. Alternatively, the neural network apparatus 10 may receive inputs of clock signals from outside the neural network apparatus 10.

The neural network apparatus 10 receives inputs of input data and outputs estimated values based on the input data. When computing the estimated values, the neural network apparatus 10 uses the clock signals to synchronize the time intervals between layers and to synchronize the time intervals between neuron models 100 in the same layer.

The learning apparatus 50 implements learning in the neural network apparatus 10. The learning mentioned here refers to adjusting the parameter values of the learning models by means of a machine learning algorithm. The learning apparatus 50 learns weighting coefficients for spike signals input to the neuron models 100. The weights $w_{ij}^{(l)}$ in Expression (4) are an example of weighting coefficients, the values of which are adjusted by the learning of the learning apparatus 50.

The learning apparatus 50 may use an evaluation function indicating evaluations of the error between estimated values output by the neural network apparatus 10 and correct values indicated by the teacher labels to learn the weighting coefficients so that the magnitude of the error between the estimated values and the correct values decreases.

The learning apparatus 50 is an example of learning means. The learning apparatus 50 is formed by using, for example, a computer.

The learning method performed by the learning apparatus 50 may be a method in which an existing learning method, such as backpropagation, has been arranged in response to the input time intervals and the output time intervals being set.

For example, in the case in which the learning apparatus 50 implements learning by using a method obtained by arranging an error backpropagation method, the weights $w_{ij}^{(l)}$ may be updated to change the weights $w_{ij}^{(l)}$ by the change amounts $\Delta w_{ij}^{(l)}$ indicated by Expression (9).

(Expression (9))

$$\Delta w_{ij}^{(l)} = -\eta \frac{\partial C}{\partial w_{ij}^{(l)}} \qquad (9)$$

$\eta$ is a constant indicating the learning rate.
C can be expressed as in Expression (10).

(Expression (10))

$$C := -\sum_{i=1}^{N^{(M)}} \kappa_i \ln\left(S_i\left(t^{(M)}\right)\right) + \frac{\gamma}{2}\left(t_i^{*(M)} - t^{(ref)}\right)^2 \qquad (10)$$

C is an example of an evaluation function for indicating evaluations of the error between estimated values output by the neural network apparatus 10 and correct values indicated by the teacher labels. C is set to be a loss function that outputs smaller values as the error becomes smaller.

M represents an index value indicating the output layer (final layer). $N^{(M)}$ represents the number of neuron models 100 included in the output layer.

$\kappa_i$ represents a teacher label. In the present case, the neural network apparatus 10 performs classification into $N^{(M)}$ classes, and the teacher labels are represented by one-hot vectors. When the value of the index i indicates the correct class, $\kappa_i=1$, and otherwise, $\kappa_i=0$.

$t^{(ref)}$ represents a reference spike.

The term "$\gamma/2(t_i^{*(M)}-t^{(ref)2})$" is a term that is provided in order to avoid learning difficulties. This term will also be referred to as a temporal penalty term. Due to the temporal penalty term, the firing timings in the output layer are distributed around the reference spike, and as a result thereof, the output neurons fire stably. $\gamma$ is a constant for adjusting the degree of influence of the temporal penalty term, and $\gamma>0$. $\gamma$ will also be referred to as a temporal penalty coefficient.

$S_i$ is a softmax function and can be expressed as in Expression (11).

(Expression (11))

$$S_i\left(t^{(M)}\right) := \frac{\exp\left(-\dfrac{t_i^{*(M)}}{\sigma_{soft}}\right)}{\sum_{j=1}^{N^{(M)}} \exp\left(-\dfrac{t_j^{*(M)}}{\sigma_{soft}}\right)} \qquad (11)$$

$\sigma_{soft}$ is a constant that is provided as a scale factor for adjusting how much the value of the softmax function $S_i$ changes when the firing timing of the output layer changes, and $\sigma_{soft}>0$. This scale factor makes stable learning possible by having a value that is approximately the same as (from $\frac{1}{10}$ of to 10 times) the output time interval.

In Expression (11), the i-th spike firing time $t_i^{*(M)}$ in the output layer satisfies the expression $0 \le t_i^{*(M)} \le 1$. For example, the spike firing time in the output layer may indicate, for each class, the probability that the classification target indicated by input data will be classified in that class. For values of i such that $\kappa_i=1$, the closer the value of $t_i^{*(M)}$ approaches 1, the smaller the value of the term "$-\sum_{i=1}^{N^{(M)}} (\kappa_i \ln(S_i(t^{*(M)})))$" becomes, so that the learning apparatus 50 calculates a smaller loss (the value of the evaluation function C).

However, the processing performed by the neural network apparatus 10 is not limited to classification.

Figure 11:
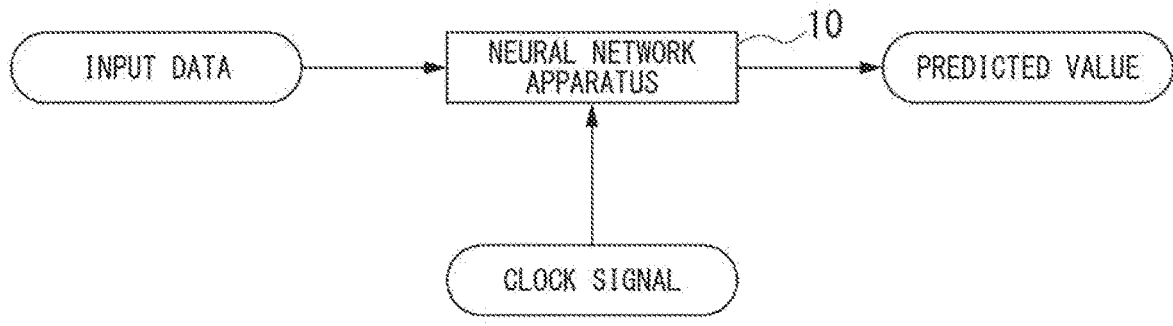
FIG. 11 is a diagram illustrating an example of input and output of signals in a neural network apparatus when operating according to the example embodiment.

FIG. 11 is a diagram illustrating an example of input and output of signals in the neural network apparatus 10 during operation.

As with the operation illustrated in FIG. 10, even while learning, the neural network apparatus 10 receives inputs of input data and acquires clock signals. The neural network apparatus 10 may include a clock circuit. Alternatively, the neural network apparatus 10 may receive inputs of clock signals from outside the neural network apparatus 10.

The neural network apparatus 10 receives inputs of input data and outputs estimated values based on the input data. When computing estimated values, the neural network apparatus 10 uses the clock signals to synchronize the time intervals between layers and to synchronize the time intervals between neuron models 100 in the same layer.

Next, the results of experiments using the neural network apparatus 10 will be explained.

Learning and tests for recognition of handwritten numeral images were performed using MNIST, which is a data set of handwritten numeral images.

The neural network 11 was configured as a fully-connected feedforward neural network having four layers, namely, an input layer, a first layer, a second layer and an output layer. The number of neuron models 100 in the input layer was 784, the number of neuron models 100 in each of the first layer and the second layer was 200, and the number of neuron models 100 in the output layer was 10.

The time widths of the input time intervals and the output time intervals were both set to 0.05 milliseconds.

As the method by which the neural network 11 indicates the estimation results, a time-based scheme was employed, in which the estimation results are indicated by which of the neuron models 100 among the neuron models 100 in the output layer outputs a spike signal first.

As a result of experiments, a recognition rate of 97.4% was obtained in terms of the recognition rate at the time of testing.

Figure 12:
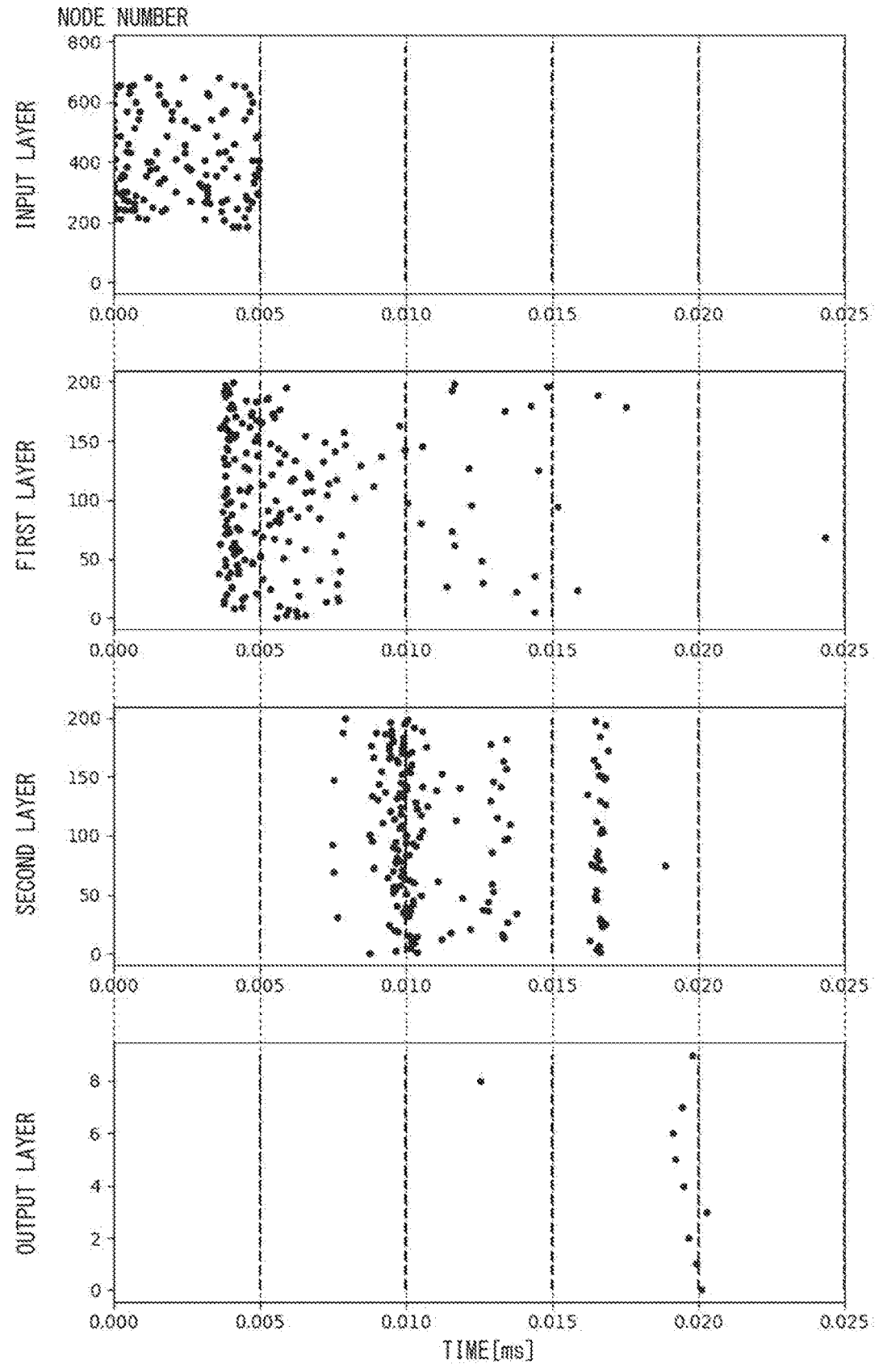
FIG. 12 is a diagram illustrating an example of threshold value attainment times when learning according to the example embodiment.

FIG. 12 is a diagram illustrating an example of threshold value attainment times when learning. FIG. 12 indicates examples of threshold value attainment times for the hypothetical case in which there is no restriction on the time periods during which the index value calculation units 110 calculate membrane potentials. The horizontal axis in FIG. 12 represents the time in terms of the elapsed time from the moment data start being input to the neural network 11. The vertical axis represents node numbers in each of the input layer, the first layer, the second layer and the output layer.

In the example in FIG. 12, of the neuron models 100 in the first layer, there are neuron models 100 in which the membrane potentials attain the threshold value later than 0.010 milliseconds, which is when the output time interval of the first layer ends. For example, there is a neuron model 100 in which the membrane potential attains the threshold value at around 0.025 milliseconds.

If the system is configured to wait until the membrane potential of this neuron model 100 attains the threshold value, then spike signals for processing the next input data cannot be input to the neuron models 100 of the first layer until around 0.025 milliseconds have elapsed.

In the second layer as well, there are neuron models 100 in which the membrane potential attains the threshold value later than 0.015 milliseconds, which is when the output time interval of the first layer ends. For example, there is a neuron model 100 in which the membrane potential attains the threshold value at around 0.019 milliseconds.

If the system is configured to wait until the membrane potential of this neuron model 100 attains the threshold value, then spike signals for processing the next input data cannot be input to the neuron model 100 of the second layer until around 0.019 milliseconds have elapsed.

Alternatively, if the calculation of the membrane potentials in each of the neuron models 100 in the first layer and in each of the neuron models 100 in the second layer is continued until the neural network 11 outputs an estimation result, then spike signals for processing the next input data cannot be input to the neuron models 100 in any of the first layer, the second layer and the output layer until around 0.013 milliseconds have elapsed, at which time the membrane potentials of the neuron models 100 of the output layer first attain the threshold value.

Figure 13:
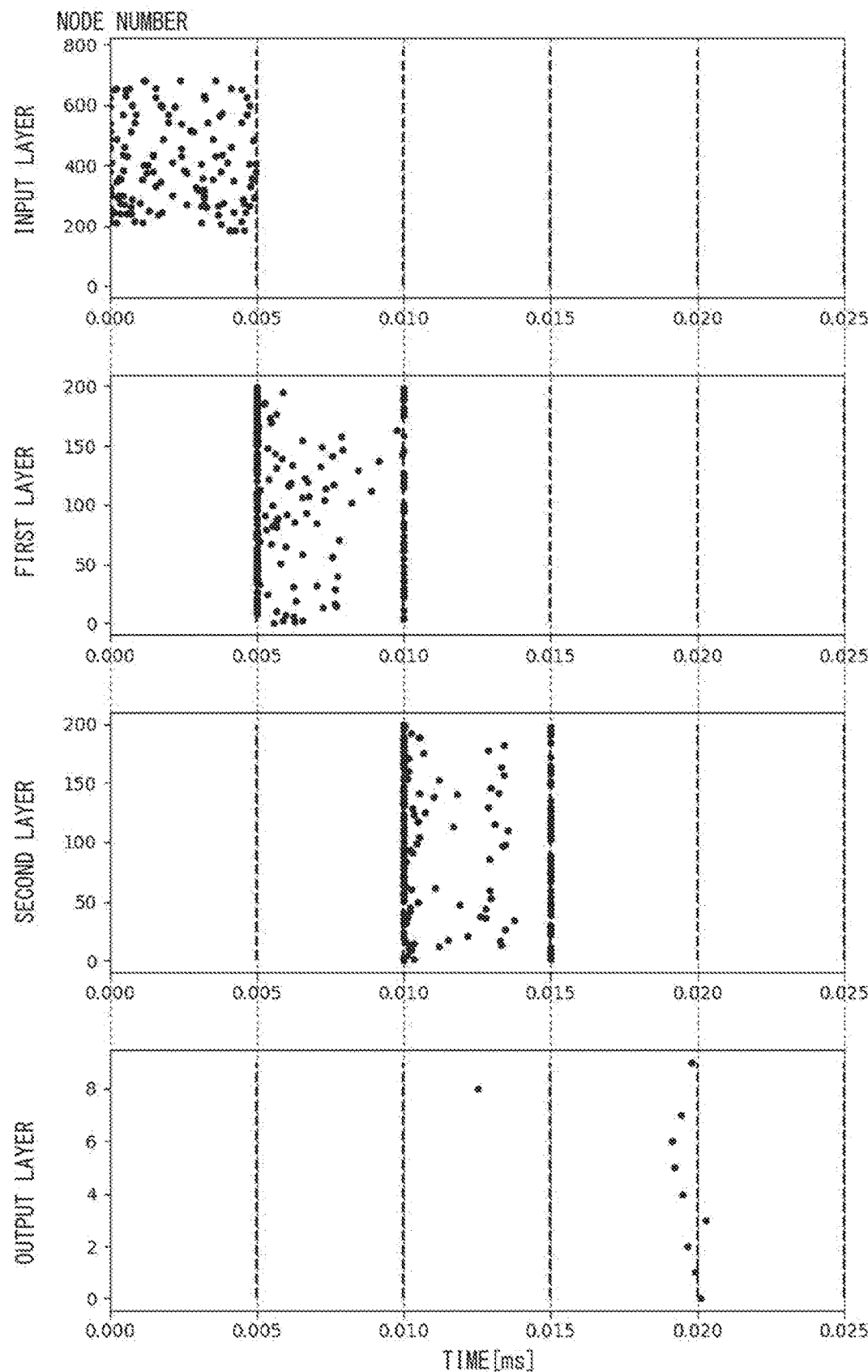
FIG. 13 is a diagram illustrating an example of firing times when learning according to an example embodiment.

FIG. 13 is a diagram illustrating examples of firing times when learning.

The horizontal axis in FIG. 13 represents the time in terms of the elapsed time from the moment data start being input to the neural network 11. The vertical axis represents node numbers in each of the input layer, the first layer, the second layer and the output layer.

In the example in FIG. 13, all of the neuron models 100 in the first layer output spike signals between 0.005 seconds and 0.010 seconds, which is the output time interval of the first layer. Thus, at and subsequent to 0.010 seconds, spike signals for processing the next input data can be input to the neuron models 100 in the first layer.

Additionally, since the firing times of the neuron models 100 in the first layer are limited to 0.005 seconds or later, the time at which the input time interval of the second layer starts can also be set to be 0.005 seconds. If there are data input earlier than the data that are the processing target in the example in FIG. 13, then the neuron models 100 in the second layer could process the previous data until 0.005 seconds elapse.

Additionally, all of the neuron models 100 in the second layer output spike signals between 0.010 seconds and 0.015 seconds, which is the output time interval of the second layer. Thus, at and subsequent to 0.015 seconds, spike signals for processing the next input data can be input to the neuron models 100 in the second layer.

Additionally, since the firing times of the neuron models 100 in the second layer are limited to 0.010 seconds or later, the time at which the input/output time interval of the output layer starts can also be set to be 0.010 seconds. If there are data earlier than the data that are the processing target in the example in FIG. 13, then the neuron models 100 in the output layer can process the previous data until 0.010 seconds elapse.

In the experiments, the timings at which the neuron models 100 of the output layer output spike signals were not limited. For this reason, among the neuron models 100 in the output layer, there are neuron models 100 that output spikes later than 0.020 milliseconds, which is when the output time interval of the output layer ends. By having the neuron models 100 in the output layer also fire during the output time interval, spike signals for processing the next input data can be input to the neuron models 100 of the output layer at and subsequent to 0.020 milliseconds, which is when the output time interval ends.

Figure 14:
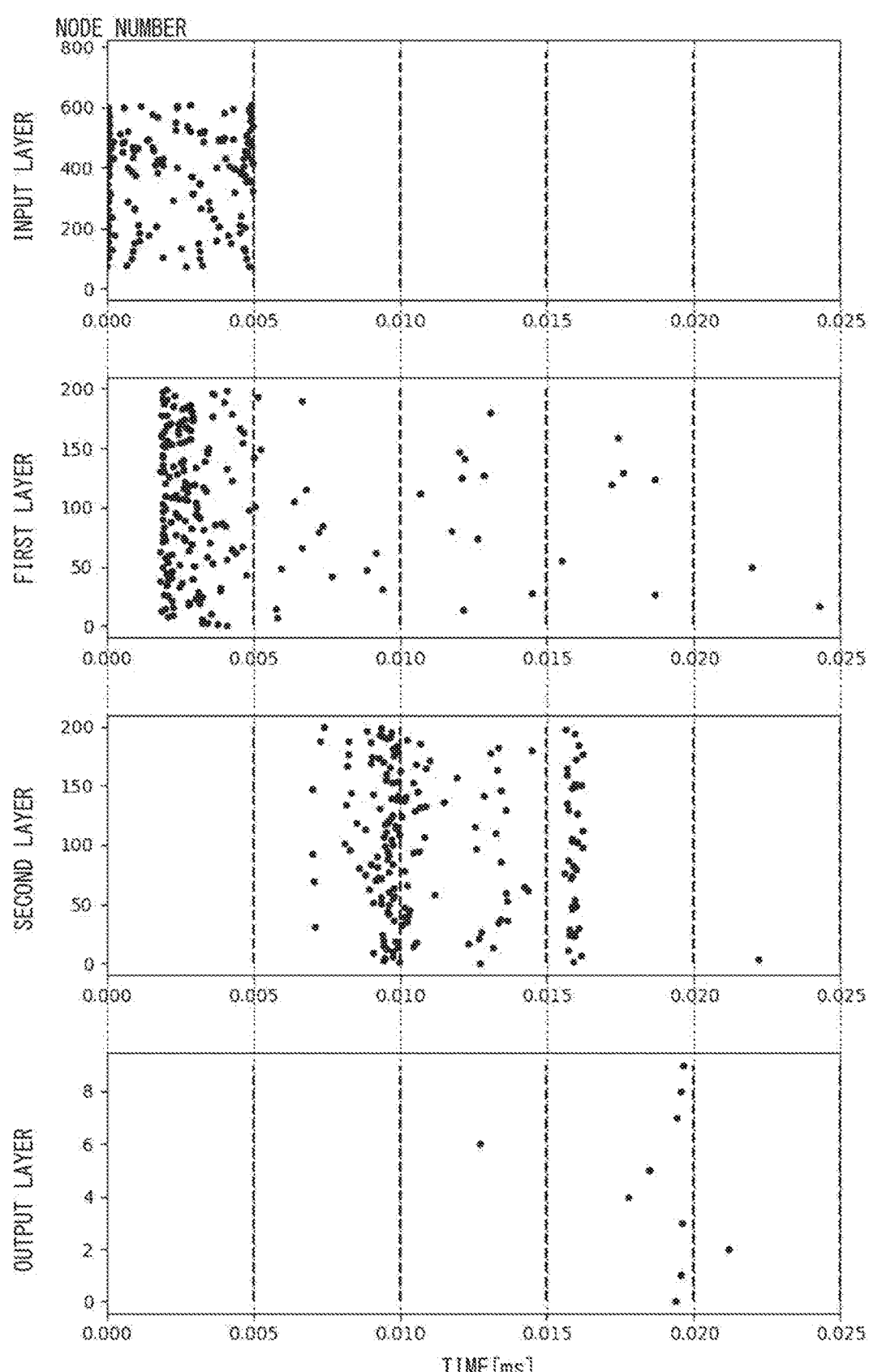
FIG. 14 is a diagram illustrating an example of threshold value attainment times during a test according to the example embodiment.

FIG. 14 is a diagram illustrating an example of threshold value attainment times during a test. FIG. 14 illustrates an example of threshold value attainment times in the hypothetical case in which there is no restriction on the time periods during which the index value calculation units 110 calculate the membrane potentials.

The horizontal axis in FIG. 14 represents the time in terms of the elapsed time from the moment data start being input to the neural network 11. The vertical axis represents node numbers in each of the input layer, the first layer, the second layer and the output layer.

In the example in FIG. 14, of the neuron models 100 in the first layer, there are neuron models 100 in which the membrane potential attains the threshold value later than 0.010 milliseconds, which is when the output time interval of the first layer ends. For example, there is a neuron model 100 in which the membrane potential attains the threshold value at around 0.025 milliseconds.

If the system is configured to wait until the membrane potential of this neuron model 100 attains the threshold value, then spike signals for processing the next input data cannot be input to the neuron models 100 of the first layer until around 0.025 milliseconds have elapsed.

In the second layer as well, there are neuron models 100 in which the membrane potential attains the threshold value later than 0.015 milliseconds, which is when the output time interval of the first layer ends. For example, there is a neuron model 100 in which the membrane potential attains the threshold value at around 0.022 milliseconds.

If the system is configured to wait until the membrane potential of this neuron model 100 attains the threshold value, then spike signals for processing the next input data cannot be input to the neuron models 100 of the second layer until around 0.022 milliseconds have elapsed.

Alternatively, if the calculation of the membrane potentials in each of the neuron models 100 in the first layer and in each of the neuron models 100 in the second layer is continued until the neural network 11 outputs an estimation result, then spike signals for processing the next input data cannot be input to the neuron models 100 in any of the first layer, the second layer and the output layer until around 0.013 milliseconds have elapsed, at which time the membrane potentials of the neuron models 100 of the output layer first attain the threshold value.

Figure 15:
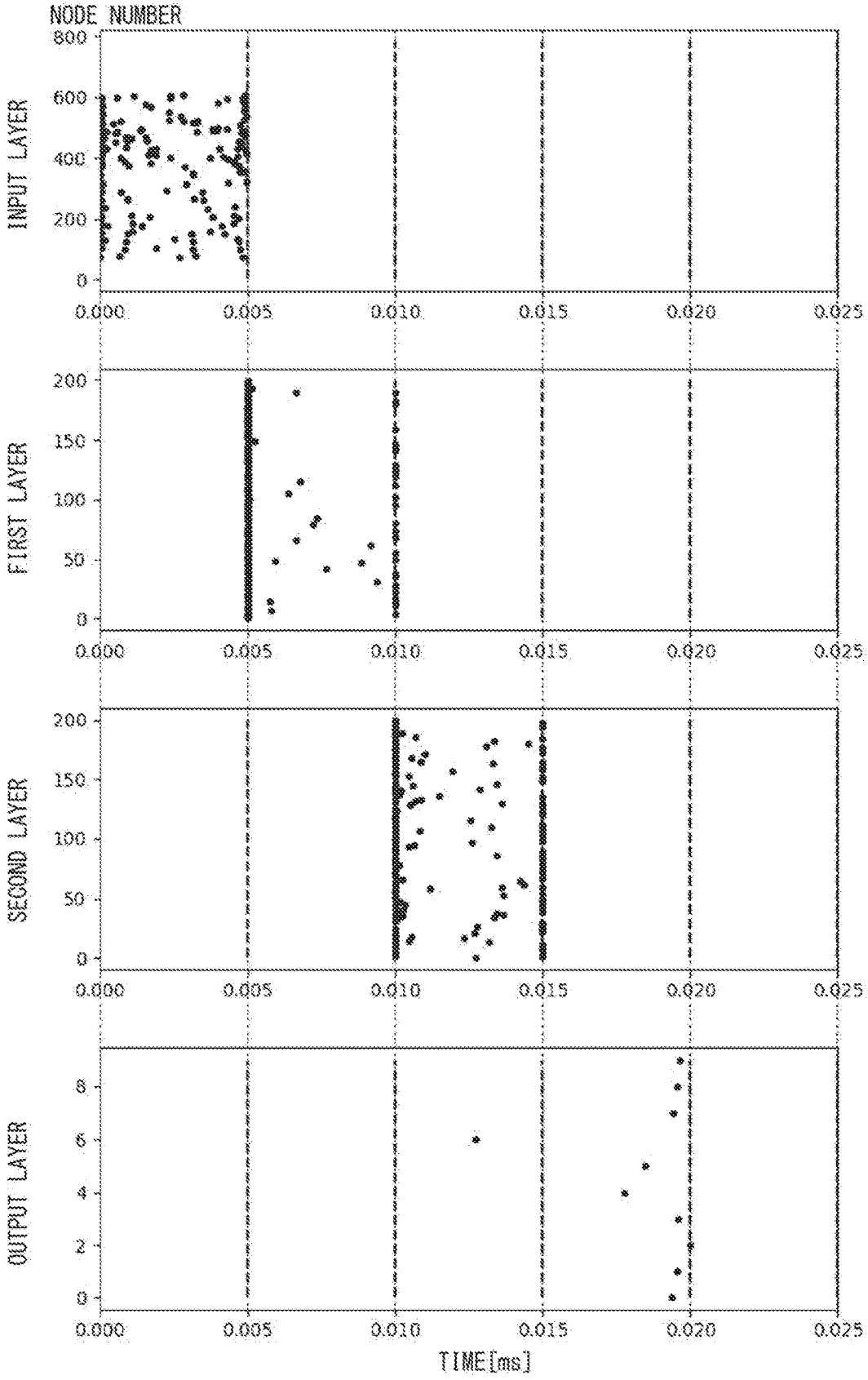
FIG. 15 is a diagram illustrating an example of firing times during a test according to the example embodiment.

FIG. 15 is a diagram illustrating examples of firing times during a test.

The horizontal axis in FIG. 15 represents the time in terms of the elapsed time from the moment data start being input to the neural network 11. The vertical axis represents node numbers in each of the input layer, the first layer, the second layer and the output layer.

In the example in FIG. 15, all of the neuron models 100 in the first layer output spike signals between 0.005 seconds and 0.010 seconds, which is the output time interval of the first layer. Thus, at and subsequent to 0.010 seconds, spike signals for processing the next input data can be input to the neuron models 100 in the first layer.

Additionally, since the firing times of the neuron models 100 in the first layer are limited to 0.005 seconds or later, the time at which the input time interval of the second layer starts can also be set to be 0.005 seconds. If there are data earlier than the data that are the processing target in the example in FIG. 15, then the neuron models 100 in the second layer can process the previous data until 0.005 seconds elapse.

Additionally, all of the neuron models 100 in the second layer output spike signals between 0.010 seconds and 0.015 seconds, which is the output time interval of the second layer. Thus, at and subsequent to 0.015 seconds, spike signals for processing the next input data can be input to the neuron models 100 in the second layer.

Additionally, since the firing times of the neuron models 100 in the second layer are limited to 0.010 seconds or later, the time at which the input/output time interval of the output layer starts can also be set to be 0.010 seconds. If there are data earlier than the data that are the processing target in the example in FIG. 15, then the neuron models 100 in the output layer can process the previous data until 0.010 seconds elapse.

By having the neuron models 100 in the output layer also fire during the output time interval, spike signals for processing the next input data can be input to the neuron models 100 of the output layer at and subsequent to 0.020 milliseconds, which is when the output time interval ends.

The type of the neural network 11 is not limited to a specific type. For example, the neural network 11 may be configured as a convolutional neural network (CNN) using a spiking neural network.

As mentioned above, if the neural network 11 is configured as a feedforward spiking neural network, then it is sufficient for there to be two or more layers in the neural network 11, and the number of layers is not limited to a specific number. Additionally, the number of neuron models 100 provided in each layer is not limited to a specific number, and it is sufficient to provide one or more neuron models 11 in each layer. Each layer may be provided with the same number of neuron models 100, or a different number of neuron models 100 may be provided depending on the layer. Additionally, the neural network 11 may be fully connected, or may not be fully connected.

Additionally, the membrane potentials of the neuron models 100 after firing are not limited so as to be unvarying from a potential of 0 as mentioned above. For example, the membrane potentials may vary in response to the input of spike signals after a prescribed time period has elapsed since firing. The number of times each neuron model 100 fires is also not limited to being a single time for each item of input data.

The structures of the neuron models 100 as spiking neuron models are also not limited to a specific structure. For example, the variation speeds of the neuron models 100 from when spike signal inputs are received until the next spike signal inputs are received need not be fixed.

The learning method in the neural network 11 is not limited to supervised learning. The learning apparatus 50 may implement learning in the neural network 11 by unsupervised learning.

As explained above, the index value calculation units 110 time-vary the membrane potentials based on the input conditions of signals during the input time intervals. The signal output units 130 output signals based on the membrane potentials during the output time intervals after the input time intervals have ended.

By setting the input time intervals during which the neuron models 100 receive spike signal inputs and output time intervals during which the neuron models 100 output spike signals in this way, the time periods during which the index value calculation units 110 are to calculate the membrane potentials can be limited to the time periods from when the input time intervals start to when the output time intervals end. During other time periods, the neuron models 100 can process other data.

According to the neural network apparatus 10, due to this feature, a spiking neural network can efficiently perform data processing.

Additionally, the index value calculation units 110 can vary the membrane potentials at variation speeds in accordance with the input conditions of signals during input time intervals. If the membrane potential does not attain the threshold value during an input time interval, then during the output time interval, the index value calculation unit 110 varies the membrane potential at the variation speed at the end of the input time interval (that is, at the variation speed that is the same as the variation speed at the end of the input time interval).

If the membrane potential attains the threshold value during the input time interval, then the signal output unit 130 outputs a spike signal at the start of the output time interval. If the membrane potential attains the threshold value during the output time interval, then the signal output unit 130 outputs a spike signal when the membrane potential attains the threshold value. If the membrane potential does not attain the threshold value during the output time interval, then the signal output unit 130 outputs a spike signal at the end of the output time interval.

As a result thereof, the time periods during which the neuron models 100 output spike signals can be limited to the output time intervals. The neuron models 100 can process other data after the output time interval ends.

According to the neural network apparatus 10, due to this feature, a spiking neural network can efficiently perform data processing.

Additionally, the output time intervals and the input time intervals are set so that the output time intervals of the first neuron models 100 overlap with (or are the same as) the input time intervals of the second neuron models that receive the spike signal inputs from the first neuron models 100.

As a result thereof, data can be efficiently transmitted from the first neuron models 100 to the second neuron models 100 by means of spike signals, allowing the first neuron models 100 and the second neuron models 100 to perform processing in the manner of pipeline processing.

According to the neural network apparatus 10, due to this feature, a spiking neural network can efficiently perform data processing.

Additionally, the index value calculation units 110 time-vary the membrane potentials based on the input conditions of signals during the input time intervals. The signal output units 130 output spike signals based on the membrane potentials during the output time intervals after the input time intervals have ended. The learning apparatus 50 learns weighting coefficients for the spike signals.

As a result thereof, the weighting coefficients can be adjusted by learning, and the estimation accuracy by the neural network apparatus 10 can be improved.

Figures 16, 17:
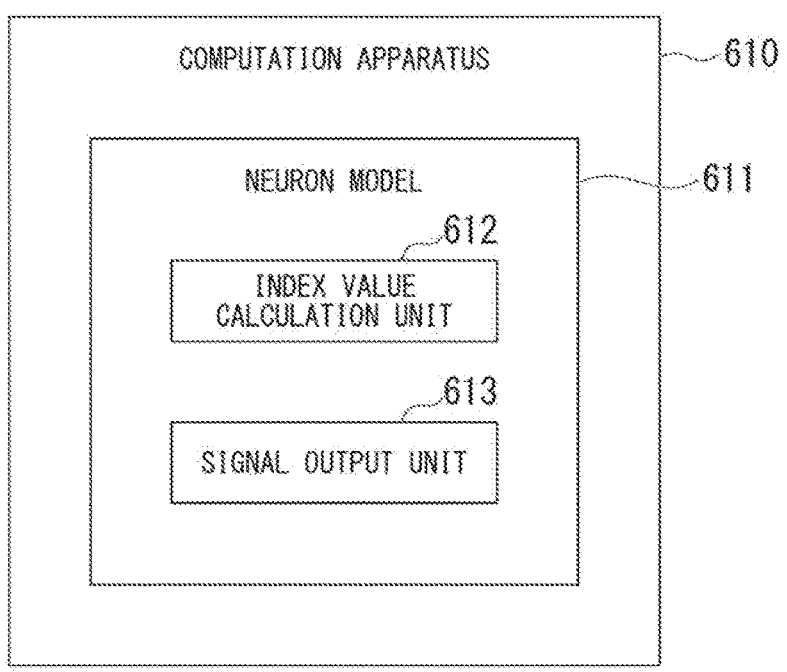
FIG. 16 is a diagram illustrating an example of the structure of a computation apparatus according to the example embodiment.
FIG. 17 is a diagram illustrating an example of the structure of a neural network system according to the example embodiment.

FIG. 16 is a diagram illustrating an example of the structure of a computation apparatus according to an example embodiment. In the structure illustrated in FIG. 11, a computation apparatus 610 includes a neuron model 611. The neuron model 611 includes an index value calculation unit 612 and a signal output unit 613.

With this structure, the index value calculation unit 612 varies the index values of signal outputs based on the input conditions of signals during input time intervals. The signal output unit 613 outputs signals, based on the index values, during output time intervals after the input time intervals have ended.

The index value calculation unit 612 is an example of an index value calculation means. The signal output unit 613 is an example of signal output means.

By setting the input time intervals during which the neuron models 611 receive signal inputs and the output time intervals during which the neuron models 611 output spike signals in this way, the time periods during which the index value calculation units 612 are to calculate the index values can be limited to the time periods from when the input time intervals start to when the output time intervals end. During other time periods, the neuron models 611 can process other data.

According to the computation apparatus 610, due to this feature, a spiking neural network can efficiently perform data processing.

FIG. 17 is a diagram illustrating an example of the structure of a neural network system according to an example embodiment.

With the structure illustrated in FIG. 17, the neural network system 620 includes a neural network body 621 and a learning unit 625. The neural network body 621 includes a neuron model 622. The neuron model 622 includes an index value calculation unit 623 and a signal output unit 624.

With this structure, the index value calculation unit 623 varies the index values of signal outputs based on the input conditions of signals during input time intervals. The signal output unit 624 outputs signals during output time intervals after the input time intervals based on the index values. The learning unit 625 learns weighting coefficients for the signals input to the neuron model 622.

The index value calculation unit 623 is an example of index value calculation means. The signal output unit 624 is an example of signal output means. The learning unit 625 is an example of learning means.

In the neural network system 620, due to these features, weighting coefficients can be adjusted by learning and the estimation accuracy by the neural network body 621 can be improved.

Figure 18:
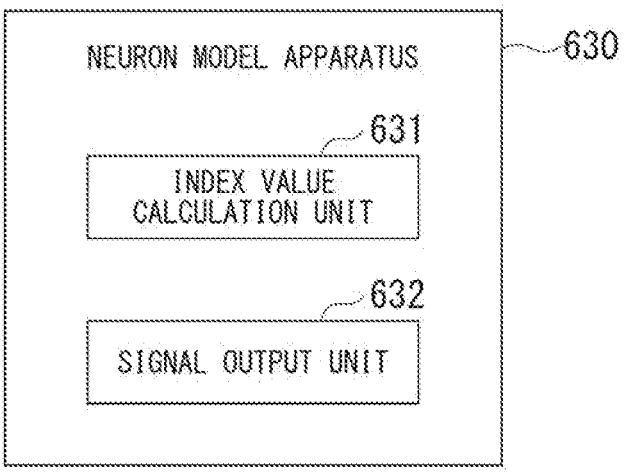
FIG. 18 is a diagram illustrating an example of the structure of a neuron model apparatus according to the example embodiment.

FIG. 18 is a diagram illustrating an example of the structure of a neuron model apparatus according to an example embodiment. With the structure illustrated in FIG. 18, the neuron model apparatus 630 includes an index value calculation unit 631 and a signal output unit 632.

With this structure, the index value calculation unit 631 varies the index values of signal outputs based on the input conditions of signals during input time intervals. The signal output unit 632 outputs signals based on the index values during output time intervals after the input time intervals have ended.

The index value calculation unit 631 is an example of index value calculation means. The signal output unit 632 is an example of signal output means.

By setting the input time intervals during which the neuron model apparatus 630 receives signal inputs and the output time intervals during which the neuron model apparatus 630 outputs spike signals in this way, the time periods during which the index value calculation unit 631 is to calculate index values can be limited to the time periods from when the input time intervals start to when the output time intervals end. During other time periods, the neuron model apparatus 630 can process other data.

According to the neuron model apparatus 630, due to this feature, a spiking neural network can efficiently perform data processing.

Figure 19:
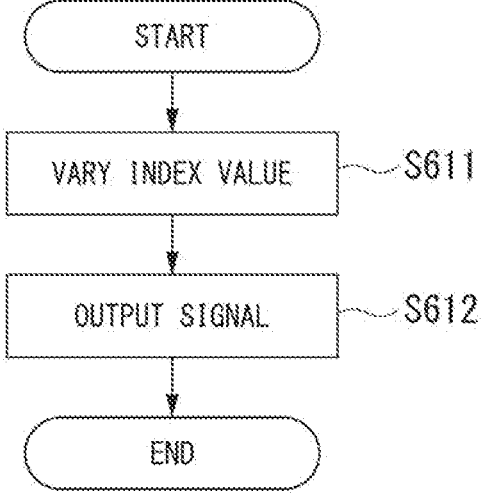
FIG. 19 is a flow chart indicating an example of the processing sequence in a computation method according to the example embodiment.

FIG. 19 is a flow chart indicating an example of the processing sequence in a computation method according to an example embodiment. The computation method indicated in FIG. 19 includes computing an index value (step S611) and outputting a signal (step S612).

When computing an index value (step S611), the index value of a signal output is varied based on the input conditions of a signal during an input time interval. When outputting a signal (step S612), a signal is output, based on the index value, during an output time interval after an input time interval.

With the computation method indicated in FIG. 19, by setting the input time intervals for receiving signal inputs and the output time intervals for outputting signals, the time periods during which the index values are to be calculated can be limited to the time periods from when the input time intervals start to when the output time intervals end. During other time periods, other data can be processed.

According to the computation method indicated in FIG. 19, due to this feature, a spiking neural network can efficiently perform data processing.

Figure 20:
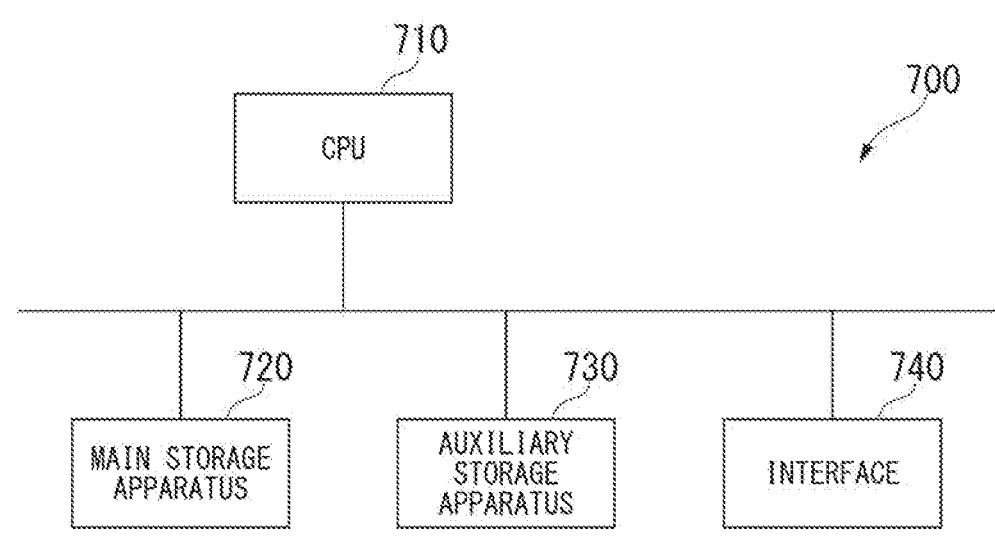
FIG. 20 is a schematic block diagram illustrating the structure of a computer according to at least one example embodiment.

FIG. 20 is a schematic block diagram illustrating the structure of a computer according to at least one example embodiment.

With the structure illustrated in FIG. 20, a computer 700 includes a CPU 710, a main storage apparatus 720, an auxiliary storage apparatus 730, an interface 740 and a non-volatile storage medium.

Any one or more or a portion of the above-mentioned neural network apparatus 10, the learning apparatus 50, the computation apparatus 610, the neural network system 620 and the neuron model apparatus 630 may be implemented on the computer 700. In this case, the operations of the respective above-mentioned processing units are stored in the auxiliary storage apparatus 730 in the form of a program. The CPU 710 reads the program from the auxiliary storage apparatus 730 and loads the program in the main storage apparatus 720, then executes the above-mentioned processes in accordance with the program. Additionally, the CPU 710 secures storage areas corresponding to the respective above-mentioned storage units in the main storage apparatus 720 in accordance with the program. Communication between each apparatus and other apparatuses is achieved by the interface 740 having a communication function and communication being performed in accordance with control by the CPU 710.

In the case in which the neural network apparatus 10 is implemented on the computer 700, the operations of the neural network apparatus 10 and the respective units therein are stored in the auxiliary storage apparatus 730 in the form of a program. The CPU 710 reads the program from the auxiliary storage apparatus 730 and loads the program in the main storage apparatus 720, then executes the above-mentioned processes in accordance with the program.

Additionally, the CPU 710 secures storage areas for the processing of the neural network apparatus 10 in the main storage apparatus 720 in accordance with the program. Communication between the neural network apparatus 10 and the other apparatuses is achieved by the interface 740 having a communication function and performing operations in accordance with control by the CPU 710. Interactions between the neural network apparatus 10 and a user are achieved by the interface 740 including a display apparatus and an input device, displaying various images in accordance with control by the CPU 710, and receiving user operations.

In the case in which the learning apparatus 50 is implemented on the computer 700, the operations of the learning apparatus 50 are stored in the auxiliary storage apparatus 730 in the form of a program. The CPU 710 reads the program from the auxiliary storage apparatus 730 and loads the program in the main storage apparatus 720, then executes the above-mentioned processes in accordance with the program.

Additionally, the CPU 710 secures storage areas for the processing of the learning apparatus 50 in the main storage apparatus 720 in accordance with the program. Communication between the learning apparatus 50 and the other apparatuses is achieved by the interface 740 having a communication function and performing operations in accordance with control by the CPU 710. Interactions between the learning apparatus 50 and a user are achieved by the interface 740 including a display apparatus and an input device, displaying various images in accordance with control by the CPU 710, and receiving user operations.

In the case in which the computation apparatus 610 is implemented on the computer 700, the operations of the computation apparatus 610 and the respective units therein are stored in the auxiliary storage apparatus 730 in the form of a program. The CPU 710 reads the program from the auxiliary storage apparatus 730 and loads the program in the main storage apparatus 720, then executes the above-mentioned processes in accordance with the program.

Additionally, the CPU 710 secures storage areas for the processing of the computation apparatus 610 in the main storage apparatus 720 in accordance with the program. Communication between the computation apparatus 610 and the other apparatuses is achieved by the interface 740 having a communication function and performing operations in accordance with control by the CPU 710. Interactions between the computation apparatus 610 and a user are achieved by the interface 740 including a display apparatus and an input device, displaying various images in accordance with control by the CPU 710, and receiving user operations.

In the case in which the neural network system 620 is implemented on the computer 700, the operations of the neural network system 620 and the respective units therein are stored in the auxiliary storage apparatus 730 in the form of a program. The CPU 710 reads the program from the auxiliary storage apparatus 730 and loads the program in the main storage apparatus 720, then executes the above-mentioned processes in accordance with said program.

Additionally, the CPU 710 secures storage areas for the processing of the neural network system 620 in the main storage apparatus 720 in accordance with the program. Communication between the neural network system 620 and the other apparatuses is achieved by the interface 740 having a communication function and performing operations in accordance with control by the CPU 710. Interactions between the neural network system 620 and a user are achieved by the interface 740 including a display apparatus and an input device, displaying various images in accordance with control by the CPU 710, and receiving user operations.

In the case in which the neuron model apparatus 630 is implemented on the computer 700, the operations of the neuron model apparatus 630 and the respective units therein are stored in the auxiliary storage apparatus 730 in the form of a program. The CPU 710 reads the program from the auxiliary storage apparatus 730 and loads the program in the main storage apparatus 720, then executes the above-mentioned processes in accordance with said program.

Additionally, the CPU 710 secures storage areas for the processing of the neuron model apparatus 630 in the main storage apparatus 720 in accordance with the program. Communication between the neuron model apparatus 630 and the other apparatuses is achieved by the interface 740 having a communication function and performing operations in accordance with control by the CPU 710. Interactions between the neuron model apparatus 630 and a user are achieved by the interface 740 comprising a display apparatus and an input device, displaying various images in accordance with control by the CPU 710, and receiving user operations.

A program for executing all or some of the processing performed by the neural network apparatus 10, the learning apparatus 50, the computation apparatus 610, the neural network system 620 and the neuron model apparatus 630 may be recorded on a computer-readable recording medium, and the program recorded on this recording medium may be read into a computer system and executed to perform the processing of the respective units. The "computer system" mentioned here includes an OS and hardware such as peripheral devices.

Additionally, the "computer-readable recording medium" may refer to a portable medium such as a flexible disk, a magneto-optic disk, a ROM (Read-Only Memory) or a CD-ROM (Compact Disc Read-Only Memory), or to a storage apparatus such as a hard disk that is internal to a computer system. Additionally, the above-mentioned program may be for realizing just some of the aforementioned functions, and furthermore, the aforementioned functions may be realized by being combined with a program that is already recorded in a computer system.

In the foregoing description, example embodiments of the present disclosure have been explained in detail by referring to the drawings. However, the specific configuration is not limited to these example embodiments and designs or the like within a range not departing from the spirit of this disclosure are also included.

What is claimed is:

1. A computation apparatus that comprises:
one or more memories storing instructions; and
one or more processors configured to execute the instructions to control the computation apparatus to implement a spiking neuron model that:
varies a potential of a signal output based on an input condition of a signal during an input time interval;
outputs, based on the potential, a signal during an output time interval that starts after the input time interval ends;
varies the potential at a variation speed in accordance with the input condition of the signal during the input time interval;
when the potential does not attain a threshold value during the input time interval, varies the potential at a variation speed that is same as the variation speed at end of the input time interval;
when the potential attains the threshold value during the input time interval, outputs the signal at start of the output time interval;
when the potential attains the threshold value during the output time interval, outputs the signal when the potential attains the threshold value; and
when the potential does not attain the threshold value during the output time interval, outputs the signal at end of the output time interval.

2. The computation apparatus according to claim 1, wherein the spiking neuron model comprises a first neuron model that outputs the signal and a second neuron model that receives the signal from the first neuron model, and
the output time interval and the input time interval are set so that the output time interval of the first neuron model overlaps with the input time interval of the second neuron model.

3. The computation apparatus according to claim 1, further comprising a clock circuit configured to generate a clock signal,
wherein the spiking neuron model detects the input time interval and the output time interval based on the clock signal.

4. A computation method comprising:
varying an index value of a signal output based on an input condition of a signal during an input time interval;
outputting, based on the index value, a signal during an output time interval that starts the input time interval ends;

varying the index value at a variation speed in accordance with the input condition of the signal during the input time interval;
when the index value does not attain a threshold value during the input time interval, varying the index value at a variation speed that is same as the variation speed at end of the input time interval;
when the index value attains the threshold value during the input time interval, outputting the signal at start of the output time interval;
when the index value attains the threshold value during the output time interval, outputting the signal when the index value attains the threshold value; and
when the index value does not attain the threshold value during the output time interval, outputting the signal at end of the output time interval.

5. The computation method according to claim 4, further comprising:
controlling a clock circuit to generate a clock signal; and
detecting the input time interval and the output time interval based on the clock signal.

6. A non-transitory recording medium that stores a program that causes a programmable apparatus to execute:
varying an index value of a signal output based on an input condition of a signal during an input time interval;
outputting, based on the index value, a signal during an output time interval that starts after the input time interval ends;
varying the index value at a variation speed in accordance with the input condition of the signal during the input time interval;
when the index value does not attain a threshold value during the input time interval, varying the index value at a variation speed that is same as the variation speed at end of the input time interval;
when the index value attains the threshold value during the input time interval, outputting the signal at start of the output time interval;
when the index value attains the threshold value during the output time interval, outputting the signal when the index value attains the threshold value; and
when the index value does not attain the threshold value during the output time interval, outputting the signal at end of the output time interval.

7. The non-transitory recording medium according to claim 6, wherein the program further causes the programmable apparatus to execute:
controlling a clock circuit to generate a clock signal; and
detecting the input time interval and the output time interval based on the clock signal.

* * * * *